US007748260B2

(12) United States Patent
Su et al.

(10) Patent No.: US 7,748,260 B2
(45) Date of Patent: Jul. 6, 2010

(54) THERMAL MECHANICAL DRIVE ACTUATOR, THERMAL PROBE AND METHOD OF THERMALLY DRIVING A PROBE

(75) Inventors: Chanmin Su, Ventura, CA (US); Robert C. Daniels, Goleta, CA (US); Craig Prater, Santa Barbara, CA (US)

(73) Assignee: Veeco Instruments Inc., Plainview, NY (US)

( * ) Notice: Subject to any disclaimer, the term of this patent is extended or adjusted under 35 U.S.C. 154(b) by 917 days.

(21) Appl. No.: 11/457,079

(22) Filed: Jul. 12, 2006

(65) Prior Publication Data
US 2008/0011065 A1 Jan. 17, 2008

(51) Int. Cl.
G01B 5/28 (2006.01)
G01Q 60/58 (2010.01)
(52) U.S. Cl. .......................................... 73/105; 850/50
(58) Field of Classification Search ................... 73/105; 850/50

See application file for complete search history.

(56) References Cited

U.S. PATENT DOCUMENTS

| | | | |
|---|---|---|---|
| 5,266,801 A | 11/1993 | Elings et al. | |
| RE34,489 E | 12/1993 | Hansma et al. | |
| 5,412,980 A | 5/1995 | Elings et al. | |
| 5,959,241 A | 9/1999 | Sriram et al. | |
| 6,189,374 B1 * | 2/2001 | Adderton et al. | 73/105 |
| 6,518,872 B1 | 2/2003 | Edinger et al. | |
| 6,647,766 B2 * | 11/2003 | Despont et al. | 73/105 |
| 6,867,443 B2 * | 3/2005 | Liu et al. | 257/226 |
| 7,141,808 B2 * | 11/2006 | Rangelow et al. | 250/492.2 |
| 2004/0020279 A1 | 2/2004 | Degertekin et al. | |
| 2006/0260388 A1 * | 11/2006 | Su et al. | 73/105 |

* cited by examiner

Primary Examiner—Daniel S Larkin
(74) Attorney, Agent, or Firm—Boyle Fredrickson, S.C.

(57) ABSTRACT

A drive actuator for a measurement instrument having a probe, the drive actuator including a heating element in a thermally conductive relationship with the probe such that application of electric current to the heating element modifies a characteristic of the probe. The probe device includes a probe including a cantilever having a lever made of a material having a selected thermal expansivity and a drive actuator in operable cooperation with the cantilever lever made of a material having a thermal expansivity different than the thermal expansivity of the material of which the cantilever lever is made.

30 Claims, 15 Drawing Sheets

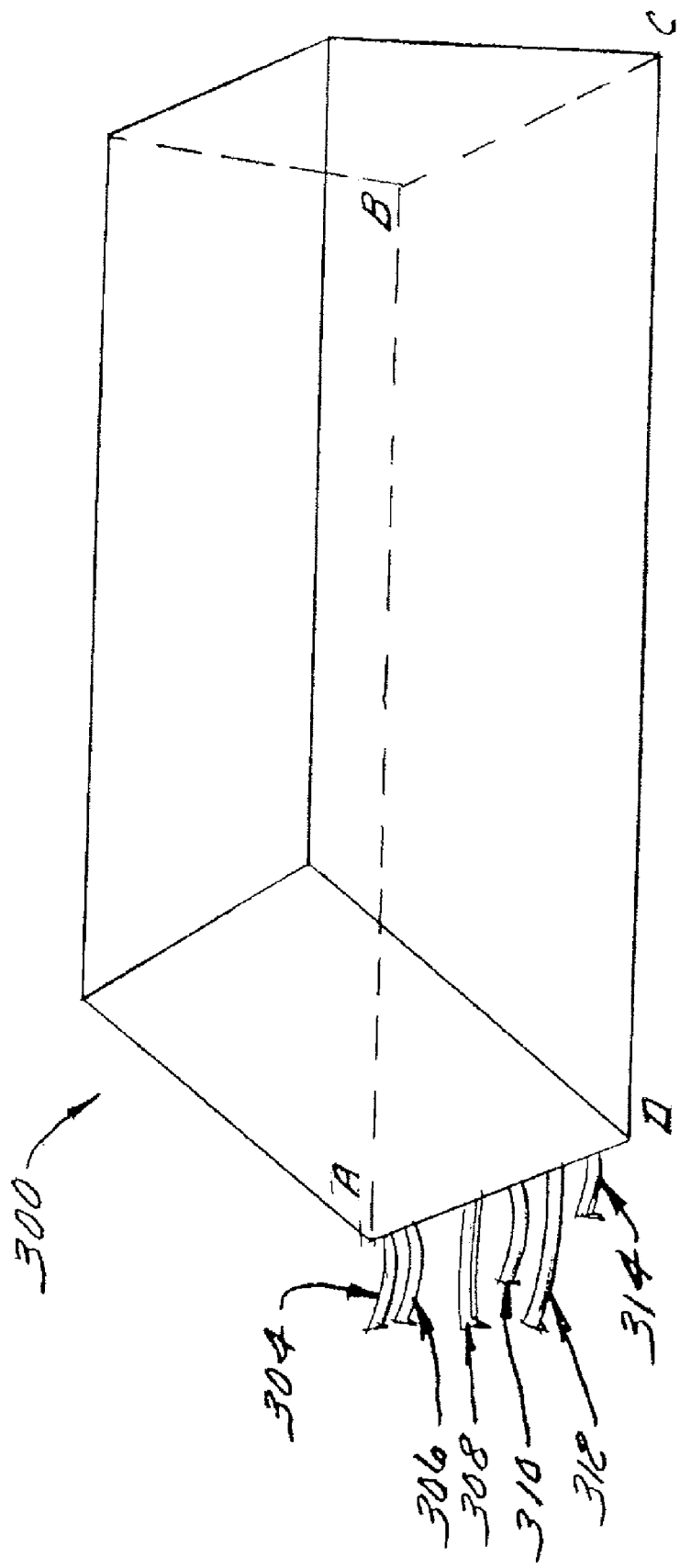

THERMAL MECHANICAL DRIVE ACTUATOR, THERMAL PROBE AND METHOD OF THERMALLY DRIVING A PROBE

FIELD OF THE INVENTION

The present invention is directed to an actuator to effect displacement of a cantilever of a measurement instrument, including that which is used in probe-based instruments of the type used in the field of scanning probe microscopy and the like, and more particularly, relates to a method and thermal mechanical drive apparatus for displacing a cantilever in a manner capable of providing positional control and sensing, as well as exciting a cantilever into oscillation.

BACKGROUND OF THE INVENTION

Several probe-based instruments have been developed that obtain information from the interaction between its sensing element and a sample being analyzed. At least some of these employ a stylus or tip carried by a lever, such as the lever of a cantilever. The stylus is located at or adjacent the free end of the cantilever and interacts with a sample during instrument operation to obtain information about the sample, such as size, surface contour or topography, shape, roughness, atomic makeup, molecular makeup, and/or other characteristics.

One type of probe-based instrument is a scanning probe microscope (SPM), which can be used to characterize a surface of a sample, even down to the atomic level, by monitoring interaction between a probe and a sample. With SPMs, the tip is typically located at or adjacent the free end of the cantilever of the probe. During operation, relative movement purposefully introduced between the sample and probe enables desired information about the sample to be obtained over a particular region or portion of the sample. During operation, this relative movement is controlled in order to scan the probe and/or sample over a particular region of the sample that is to be analyzed. For instance, where the information obtained relates to the contour of an outer surface of the sample, it can be used to generate a topographic map or the like from which the outer sample surface can be visualized.

An atomic force microscope (AFM) is a very popular type of SPM. A cantilever of a typical AFM probe includes such a tip and is fixed or otherwise extends outwardly at its base from a support or substrate of the probe device. The lever of the cantilever usually is quite small, typically having a width no greater than about fifty microns and a length no greater than about 500 microns (and can be as short as ten microns or less). The tip of the probe usually is quite sharp and can have a radius that is somewhere around three and fifty nanometers in diameter.

During operation, the probe is brought very near to or into contact with a surface of a sample to be examined, and a deflection of the cantilever in response to the interaction of the probe tip by moving either or both of the probe and the sample, with the sample is measured with an extremely sensitive deflection detector. An example of one type of often used deflection detector is an optical lever system, such as described in Hansma et al. U.S. Pat. No. RE 34,489. If desired, some other type of deflection detector, including a deflection detector that employs one or more strain gauges, capacitance sensors, or the like can be used.

The probe is scanned over the sample surface to obtain the desired information about the sample for a particular region or area of the sample. For example, a high-resolution three axis scanner that acts on the sample, support, and/or the probe can be employed. Such a scanner provides the relative motion between the probe and the sample to be carefully controlled, enabling the AFT to measure, for example, the topography or some other surface characteristic of the sample, such as is described in, e.g., Hansma et al. U.S. Pat. No. RE 34,489; Elings et al. U.S. Pat. No. 5,226,801; and Elings et al. U.S. Pat. No. 5,412,980.

AFMs may be designed to operate in a variety of modes, including contact mode and oscillating mode. In contact mode operation, the probe is typically scanned across the surface of the sample while keeping the force of the tip of the probe against the surface of the sample generally constant. This is usually accomplished by moving either the sample or the probe vertically relative to the surface of the sample being analyzed in response to sensed deflection of the cantilever as the probe is scanned horizontally across the surface of the sample. Vertical motion feedback information can be stored, along with other tip-sample interaction feedback information, and used in constructing an image or the like representative of the surface of the sample that corresponds to the sample characteristic being measured, e.g., surface topography.

Depending on the AFM, some AFMs can operate in an oscillating mode, such as TappingMode™ (TappingMode™ is a trademark owned by Veeco Instruments Inc. of Santa Barbara, Calif.). In TappingMode™, the probe is oscillated at or near a resonant frequency of the cantilever. The amplitude or phase of this oscillation is kept constant during scanning using feedback information, which is obtained from tip-sample interaction feedback signals. As in contact mode, information is obtained using such feedback signals, which typically are collected, stored, and used as data to characterize the sample.

Regardless of their mode of operation, AFMs can obtain resolution down to the atomic level on a wide variety of insulating or conductive surfaces in air, liquid or vacuum. Such AFMs typically do so using piezoelectric scanners, optical lever deflection detectors, and very small cantilevers fabricated using, for example, photolithographic techniques. Because of their resolution and versatility, AFMs are important measurement devices used in many diverse fields ranging from semiconductor manufacturing to biological research.

There are many ways to control the position and movement of the sensor tip, most of which involve actuating the cantilever in some way. This typically is done using one or more drives, typically configured as actuation elements such as a piezo actuator attached to the substrate or base of the probe holder device. The cantilever drive, in turn, is further attached to a translational scanner which displace the probe in z and xy directions. A displacement control signal is provided to each of the piezo elements as needed to displace the cantilever and/or the sample, such as to produce the relative movement between the probe and sample to scan the sample in the desired manner. If desired, more than one drive signal can be inputted to a particular actuation element and/or the inputted drive signal can be made up of multiple components. In any event, a desirably configured drive signal provided to an appropriate drive(s) can be used to oscillate the probe tip where such oscillation is desired.

The drive signal typically is an electric signal. The drive signal is generated by some other component, such as a controller or the like. The resultant drive signal can be based on feedback of some sort. For example, it is common for a drive signal used in exciting a probe into oscillation to be based at least in part on feedback of some form. For example, one type of commonly used feedback is obtained from analyzing or measuring the force of the tip interacting with the sample during operation.

Depending upon the magnitude, polarity and frequency of the applied voltage of the drive signal, selective actuation of the cantilever helps locate the tip of the probe relative to the sample during operation. In addition, where it is desired to oscillate the tip, this enables the cantilever to be excited so that it and the tip will oscillate at a desired frequency or within a desired frequency range during operation.

Feedback, such as feedback relating to forces between the tip and the sample, is often used to determine how to position the cantilever. For example, where oscillating the tip, feedback relating to the interaction force between the tip and sample can be used in determining a control signal or some component thereof that is provided to one or more of the positioning devices to produce the desired oscillation and/or move the cantilever in a desired manner. The cantilever drive signal can be based on, for example, the same as, or a proportional frequency, to a resonant or natural frequency.

One commonly used type of drive is a piezoelectric drive, such as is typically employed in piezoelectric scanners. A typical piezoelectric drive includes a plate or stack of piezoelectric material located at or adjacent a fixed end of the cantilever. A drive signal, in the form of an applied voltage, is applied to the piezoelectric material to cause it to expand or contract, depending upon polarity of the applied voltage.

Because AFM's use such small cantilevers, which are roughly 1000 times smaller than the cantilevers used in more traditional cantilever measurement instruments, it has been a challenge to couple the piezoelectric actuation to excite the cantilevers. Conventionally, the piezo-stack attached to the probe device base is used to actuate the entire base, causing the cantilever to oscillate due to inertial force. The weight of the base is usually more than one-hundred thousand times than that of the cantilever, and therefore the actuation required to move the base takes significant mechanical power that causes the system to communicate significantly more mechanical energy to the environment than to the cantilever itself. The excess mechanical energy passed to the environment often results in parasitic resonances of the entire fixture.

These problems can be tolerable in certain instances, for example when the analysis is performed in air given the high mechanical Q of the cantilever. Even though the piezo drive coupled to the cantilever is mechanically "dirty," the high Q cantilever, with Q as much as 100 to a few hundreds in air, functions as a 40 db to 60 db bandpass filter. The oscillation signal of the cantilever is therefore clean and free of parasitic resonance in most cases. However when the cantilever is placed in fluid, an environment needed, for example, when imaging biological samples, the mechanical Q factor of the cantilever drops to two to three, and all the parasitic resonances are coupled into the cantilever oscillation. Such abundant parasitic resonances in fluid are often called "forest of peaks," referring to the resultant response (amplitude vs. frequency) curve. This is one of the major problems with AFM operation in fluid.

These problems have been relatively adequately addressed in the past by including a layer of piezoelectric material deposited on the cantilever itself to form a composite cantilever. Voltage applied to the piezoelectric layer induces strain in the piezoelectric layer, which in turn causes the cantilever to correspondingly displace. Unfortunately, fabrication of these types of composite cantilevers can be undesirably complicated and may not always work well in a fluid environment, particularly when passivation is required.

Another type of drive that has been investigated in the past is a magnetic drive. A magnetic drive utilizes a composite cantilever construction that employs a magnetic layer disposed on the cantilever in place of the piezoelectric layer. A magnetic drive coil is located in the vicinity of the magnetic layer on the cantilever. Electric current introduced to the magnetic drive coil generates a magnetic field that acts upon the magnetic layer of the cantilever to cause the cantilever to correspondingly displace. While this type of composite cantilever requires no passivation, the magnetic drive coil inherently functions as a low pass filter, which can undesirably limit the frequency at which it can oscillate the cantilever. For example, the low pass filter characteristics of the magnetic drive coil can limit the effective cantilever oscillation frequency of magnetic drives to less than about 50 kHz or lower. In addition, this type of composite cantilever fabrication poses considerable challenges, especially with regard to large current heating of the coil, in the order of one amp. Finally, sharpness of the probe tip is often compromised as a result of the magnetic coating, which can significantly limit the applications in which this type of a composite cantilever can be used.

A further type of drive that is useful is an ultrasonic drive. An ultrasonic drive employs an ultrasonic wave generator that directs ultrasonic waves toward the cantilever in a direction normal to the cantilever and in-line with the desired direction of cantilever displacement. Ultrasonic waves have been used not only to displace the cantilever in a desired direction at a desired magnitude, they have also been employed to excite a cantilever into oscillation.

While an ultrasonic drive works with any type of cantilever and does not require any special cantilever fabrication, it poses its own unique challenges because it requires focusing of the ultrasonic waves into a beam that accurately impinges against the cantilever. Because scanning probe cantilevers are so small, it can be difficult to consistently focus the ultrasonic beam onto the cantilever resulting in inconsistent drive operation. In addition, where the cantilever is used in a fluid environment, the ultrasonic beam typically creates a high pressure gradient in the fluid, which can lead to a disadvantageous phenomenon called "acoustic streaming." When this occurs, the high pressure gradient in the fluid causes fluid convection in the vicinity of the cantilever, which may cause the cantilever to move in a random and uncontrollable manner. Cantilever force sensing can be compromised, which in turn can adversely impact cantilever control, all of which can render the results obtained unusable.

Other arrangements have also been employed to excite or cause a cantilever to displace, including in an oscillatory manner. One such arrangement is an electrostatic drive that electrostatically excites the cantilever using an electrically charged electrode located in the vicinity of the cantilever. This produces an attractive force that attracts the cantilever to the electrode. The frequency and magnitude of the voltage applied to the electrode can be varied to correspondingly drive the cantilever, including into oscillation.

Another such arrangement is a magnetostatic drive that employs magnetostatic excitation to drive the cantilever. A small magnet having a mass much less than that of the cantilever is attached at or adjacent the free end of the cantilever. A magnetic drive coil is placed in the vicinity of the cantilever and an electric current is applied to cause the coil to generate a magnetic field. The magnetic field acts upon the magnet on the cantilever thereby causing the cantilever to displace in concert with the magnet. The frequency and intensity of the magnetic field produced by the coil can be varied by correspondingly varying the frequency and magnitude of the applied electric current, which typically is alternating current or the like.

A still further arrangement is an induced eddy current drive. This type of drive utilizes a high frequency coil placed in the vicinity of an electrically conductive cantilever. Voltage or current is applied to the coil to cause a magnetic field to be generated that induces an eddy current in the cantilever. Because the eddy current, in turn, produces another magnetic field, the resultant interaction between it and the magnetic field generated by the coil excites the cantilever if the frequency of the magnetic field is modulated at a lower frequency so as to permit the cantilever to mechanically follow.

While several of these types of drive arrangements have proven to be very successful, improvements nonetheless remain desirable. Hence, the need has arisen for a method and arrangement for displacing the cantilever in a controllable manner which can be used alone or in combination with one or more of the aforementioned drive arrangements. The need has also arisen for a method and arrangement of providing an array of probes located sufficiently close to aid operational speed and ease of use by, for example, lessening tedious set-up procedures.

SUMMARY OF THE INVENTION

The present invention is directed to a probe, drive, drive actuator, drive controller, and control method for a probe based measurement instrument capable of changing at least one parameter or a characteristic of the probe via direct operable cooperation between the drive actuator and the probe. The present invention is particularly well suited for use with cantilever-type measurement instrument probes, including those used for nano and atomic scale measurement.

In one preferred embodiment, the probe has an elongate outwardly projecting cantilever that operably cooperates with a drive that changes at least one parameter or characteristic of the cantilever by creating deflection of the cantilever. The drive includes a drive actuator that causes a stress gradient to arise between it and the cantilever when driven during operation. The drive actuator preferably is of thermally conductive construction and made of a material having a different thermal expansivity than that of the cantilever. The drive actuator preferably operably cooperates with the cantilever by having at least some part in direct contact with a lever of the cantilever. Such a lever is used in sensing and/or measurement and can include a sensing element or the like, such as a probe tip of the kind commonly used in AFM applications. Preferably, to achieve the performance contemplated by the invention, the force cycle of the probe, which is determined by heating and cooling of the probe as its driven, characterized by a heating/cooling cycle time, is controlled to correspond to the desired oscillation cycle.

In another preferred embodiment, the cantilever lever is part of a hinge arrangement that includes a fulcrum disposed in a hinge pocket formed between a pair of spaced apart forks of a base or substrate that can be a chip type base or the like. The cantilever sensing lever is a driven lever that extends outwardly from the fulcrum, which preferably is substantially transverse relative thereto. The fulcrum cantilever hinge arrangement also includes at least one drive lever extending outwardly from the fulcrum in a direction different than that of the sensing lever. Preferably, the sensing lever extends outwardly from the fulcrum in one direction and each drive lever extends outwardly from the fulcrum in an opposite direction.

In one preferred fulcrum hinge embodiment, there is only a single drive lever extending in a direction opposite the sensing lever and which can be located in line with the lever. In another preferred fulcrum hinge embodiment, there are a plurality of spaced apart drive levers, each of which extends in a direction away from the sensing lever. Each drive lever preferably extends adjacent the base or substrate and is in operable cooperation with at least one drive actuator such that there preferably is direct mechanical contact and interaction therebetween. Such a drive actuator can be of thermally conductive and/or thermal stress differential inducing construction, if desired.

One preferred drive actuator is a thermal mechanical drive actuator that is in direct contact with at least part of the sensing lever of the cantilever. The thermal mechanical drive actuator is thermally conductive and possesses a coefficient of thermal expansion that preferably is substantially different to that of the cantilever sensing lever. The thermal mechanical drive actuator preferably also is electrically conductive such that electric current flow generates heat that causes a thermal stress differential between the drive actuator and cantilever measurement lever that affects at least one cantilever parameter or characteristic.

Another preferred drive actuator is a plurality of thermal mechanical drive actuators that are in direct contact with at least part of a plurality sensing levers. Each actuator is indexed to a corresponding lever operably independent of other levers.

Yet another preferred thermal mechanical drive actuator is composed of a metallic material, preferably a metal or metallic film fixed to or otherwise applied to or on part of the cantilever sensing lever. The thermal mechanical drive actuator is an electric resistive or Joule type heating element that generates heat upon receiving a drive signal current from a drive controller or the like.

Where a single thermal mechanical drive actuator is employed, it preferably is symmetric about an axis of the cantilever that preferably is a longitudinal axis of the sensing lever. In one preferred embodiment, a single thermal mechanical drive actuator is mirror-imaged about a central longitudinal axis of a cantilever sensing lever. In another preferred embodiment, the thermal mechanical drive actuator is offset so as to be asymmetric such as by having all or a substantial portion of it disposed on one side of such a longitudinal cantilever axis.

Where the thermal mechanical drive actuator is symmetric, thermal mechanical drive operation preferably results in relative deflection or displacement of the sensing lever in a Z-direction in flexural mode. Where asymmetric, torsional deflection can be induced. Depending on the construction, arrangement, orientation of the thermal mechanical drive actuator and the like, torsional and Z-direction displacement or deflection can be induced preferably substantially simultaneously.

A plurality of thermal mechanical actuators can be used if desired. In one preferred implementation, a pair of thermal mechanical drive actuators are symmetrically disposed relative to a longitudinal axis of the sensing lever. In one preferred embodiment, each thermal mechanical drive actuator has a common heating element pattern that can be mirror imaged about an axis that preferably is a central longitudinal sensing lever axis.

Where a pair of thermal mechanical drive actuators are employed, each drive actuator can be independently driven so as to independently impact some characteristic or parameter of the cantilever sensing lever. In one preferred method of operation, drive signals applied to each thermal mechanical drive actuator can be controlled to cause the sensing lever to deflect or displace in a Z-direction, a Y-direction, and/or torsionally by adjusting the synchronization relation (phase) of the drive signals to each element of the actuators.

A thermal mechanical drive constructed in accordance with the present invention preferably also includes a thermal reservoir in operable cooperation with another part of the probe device, preferably the base or substrate. The thermal reservoir preferably is in direct contact with the base or substrate.

The thermal reservoir preferably has a thermal mass larger than that of the drive actuator such that it helps keep the cantilever sensing lever at a desired thermal operating point and helps facilitate cooling when cooling is desired. The thermal reservoir has an exposed surface area that is much larger than that of the corresponding thermal mechanical drive actuator to help increase convective cooling. The thermal reservoir preferably also has a contact surface area with the base or substrate that is also much greater than that of the thermal mechanical drive actuator to help facilitate conductive cooling.

Where a cantilever equipped with a fulcrum cantilever hinge arrangement is used, at least one drive actuator, such as preferably a thermal mechanical drive actuator, is disposed in operable cooperation with a cantilever drive lever instead of with a sensing lever. For example, where a fulcrum hinge arrangement includes a single drive lever, a single drive actuator in operable cooperation therewith can be used or a plurality of spaced apart drive actuators can be used. Where the fulcrum cantilever hinge arrangement has a plurality of drive levers, there preferably is a drive actuator for each drive lever. Each drive actuator preferably is in direct contact with at least a part of the drive lever, the fulcrum or both. Each drive actuator preferably is a thermal mechanical drive actuator but another type of direct contact cantilever drive actuator can be employed with a fulcrum cantilever hinge arrangement constructed in accordance with the invention.

Where a cantilever that includes a fulcrum cantilever hinge arrangement having a plurality of drive levers is used, a separate drive actuator for each drive lever enables more precise cantilever control during operation. For example, each drive actuator can be independently driven to control relative cantilever sensing lever position along a plurality of directions or axes. In one preferred embodiment, each drive lever operably cooperates with a separate drive actuator such that independent drive actuator control enables the cantilever sensing lever to be displaced or deflected in a Z-direction, a Y-direction and both a Z-direction and Y-direction substantially simultaneously during real time measurement instrument operation. In addition, depending upon the configuration of the fulcrum hinge arrangement, the drive actuators, and the nature and methodology of drive control employed, torsional deflection of the sensing lever can also be induced.

A drive controller particularly well suited for controlling a thermal mechanical drive constructed in accordance with the present invention preferably produces a drive signal causing the thermal mechanical drive actuator to generate heat and produce a thermal stress differential between it and that part of the cantilever with which it operably cooperates. Such a thermal mechanical drive controller preferably is configured to produce a drive signal that can remain constant and/or vary in voltage, current and the like such that it is tailored for the application.

In one preferred embodiment, the thermal mechanical drive controller is configured to be capable of selectively outputting a DC or steady state thermal mechanical drive actuator drive signal as well as a variable thermal mechanical drive actuator signal, preferably a variable frequency or AC drive signal. Where simple displacement or deflection is desired, a DC thermal mechanical drive actuator signal is outputted and controlled as needed to increase or decrease deflection or displacement. Where oscillation is desired, a variable frequency thermal mechanical drive actuator signal is outputted and controlled as needed to actuate the cantilever into oscillation.

In one preferred method of operation, a DC drive signal is applied to heat or pre-heat the cantilever to a temperature above that of ambient. Thereafter, the DC drive signal is controllably varied along with that of a variable frequency thermal mechanical drive signal to control displacement and/or deflection of the cantilever so as to be capable of exciting into oscillating at relatively high frequencies greater than 10 kHz and higher. By preheating the cantilever to an operating point temperature greater than ambient and preferably keeping the operating point temperature above ambient, cantilever cooling occurs more quickly advantageously increasing cantilever response enabling higher oscillation frequencies to be achieved.

Such a thermal mechanical drive controller can be of standalone construction or integrated into part of another controller, such as an AFM controller or the like. Where more than one thermal mechanical drive is employed, separate thermal mechanical drive controllers can be used or a single thermal mechanical drive controller equipped with a delay, such as for shifting frequency and/or phase, can be implemented to selectively and independently control the drive signal respectively provided to each thermal mechanical drive actuator.

If desired, a thermal mechanical drive controller constructed in accordance with the invention can utilize feedback in generating a thermal mechanical drive actuator drive signal. For example, cantilever positional and/or force feedback information based on RMS and/or lock-in detection can be used by the thermal mechanical drive controller and the thermal mechanical drive controller can be configured with PI or PID control, for example.

According to an aspect of the present invention, a drive actuator for a measurement instrument that utilizes a probe to interact with a sample includes a heating element in a thermally deflectable relationship with the probe such that application of electric current to the heating element modifies a characteristic of the probe.

In another aspect of this embodiment, electrical current is applied to the measurement instrument probe heating element so as to generate heat that is thermally conducted to the measurement instrument probe during interaction with the sample. The heat is used to modify the deflection of the cantilever and causing changes in interaction between the probe and the sample.

In an even further aspect of this embodiment, the probe includes an elongate cantilever having a fixed end coupled to a base or substrate of the probe device, and a lever cantilevered outwardly therefrom that carries a sensing element. In this case, upon application of electric current a thermal stress differential between the heating element and at least a portion of the cantilever is created. This thermal stress modifies interaction between the sensing element and the sample. Preferably, the probe is made of a material having a coefficient of thermal expansion that is less than a coefficient of thermal expansion of an electrically and thermally conductive material of which the heating element is made.

According to another embodiment, the thermal stress differential between the heating element and the drive cantilever constrained at both ends changes a spring constant of the constrained cantilever without causing substantial deflection of the cantilever.

In another embodiment, the thermal stress differential created between the heating element and the cantilever can change a Q-factor of the cantilever.

In yet another aspect of this embodiment, the thermal stress differential oscillates the sensing element. In one mode of operation, the sensing element can be oscillated at a torsional resonance.

In a still further aspect of this embodiment, the probe includes a cantilever having a fixed end coupled to a base or substrate of the probe device, and a lever cantilevered outwardly therefrom that carries a probe tip that projects outwardly from one of a top and bottom surface of the lever and interacts with a sample during measurement. The heating element can be carried by the other one of the top and bottom surface of the lever. The heating element can also include a resistance heating element composed of an electrically and thermally conductive material disposed in direct contact with at least a portion of the probe.

In yet another aspect of this embodiment, the probe includes a cantilever having a fixed end coupled to a base or substrate of the probe device and a lever cantilevered outwardly therefrom that carries a tip that interacts with a sample. The plurality of spaced apart heating elements can include a first heating element disposed on one side of the longitudinal probe axis and a second heating element disposed on the other side of the longitudinal probe axis.

According to another aspect of the preferred embodiment, a thermal probe device includes a probe including a cantilever having a lever made of a material having a selected thermal expansivity and a drive actuator in operable cooperation with the cantilever lever made of a material having a thermal expansivity substantially different from the thermal expansivity of the material of which the cantilever lever is made.

According to another embodiment, the drive actuator is made of a thermally conductive material with thermal expansivity similar or greater than metals and the cantilever lever is made of a semiconductor material such that applied heat creates a thermal stress differentially between the drive actuator and the cantilever lever that causes at least a portion of the cantilever lever to deflect.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

One or more preferred exemplary embodiments of the invention are illustrated in the accompanying drawings in which like reference numerals represent like parts throughout, and in which:

FIG. 21 is a schematic illustration showing the chosen indexed cantilever in service while other levers are lifted from their service positions.

Figure 1:
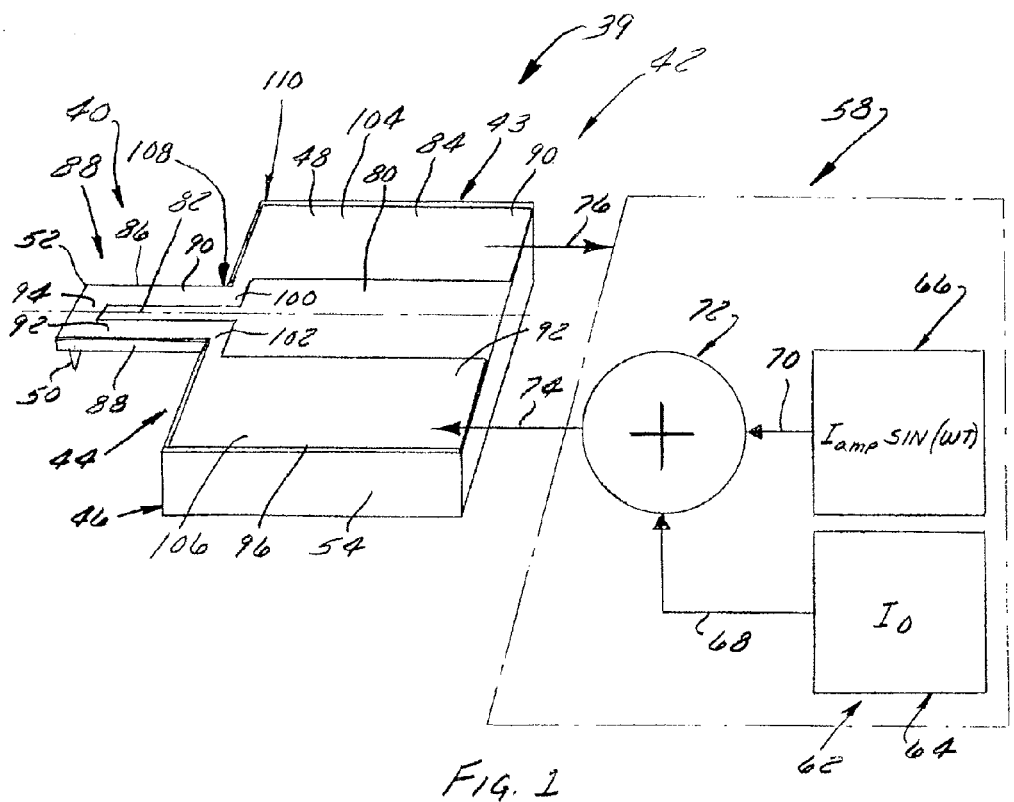
FIG. 1 illustrates a perspective view of a preferred embodiment of a measurement instrument cantilever and drive therefor along with a schematic block diagram representation of a preferred drive controller connected thereto.

Before explaining the embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 20:
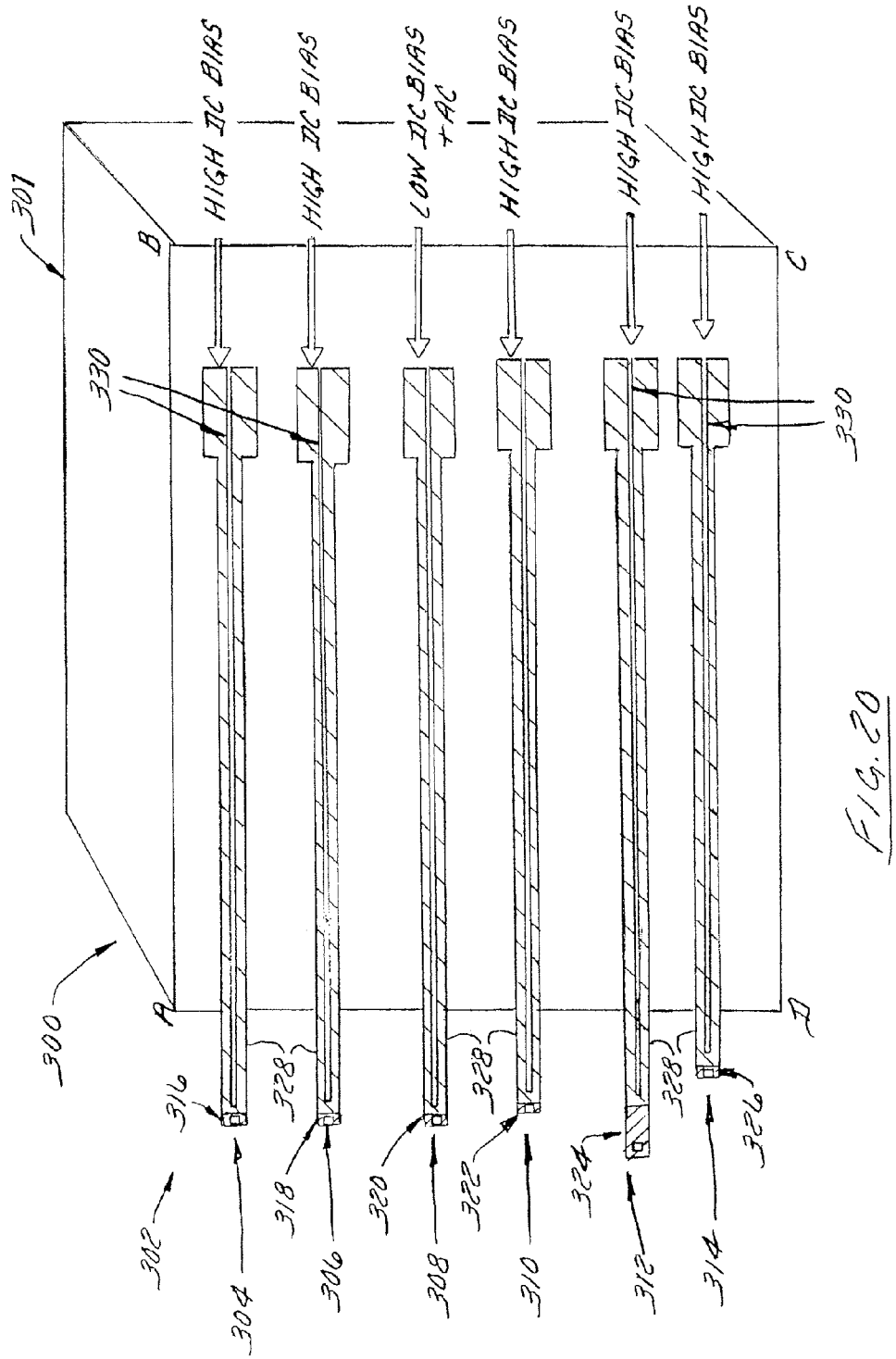
FIG. 20 is a schematic illustration showing multiple cantilevers with substantially different characteristics are driven by a thermal mechanical drive such that only one lever serves at the lowest point for tip-sample interaction.

FIG. 1 illustrates a preferred and exemplary embodiment of a thermally drivable probe device 39 including a probe 40 and a thermal mechanical drive 42 that is constructed and arranged to facilitate displacement or excitation thereof. The probe 40 includes a cantilever 44 that defines a lever arm or lever 88 extending outwardly from a substrate or base 46 of probe device 39 at its fixed end. The thermal mechanical drive 42 includes a thermal actuator 43 that is disposed in thermally conductive contact with at least a portion of the cantilever 44, such as the lever 88, the substrate 46, or both the lever 88 and substrate 46 (such as depicted in FIG. 1). The thermal actuator 43 preferably is composed of a electrically and thermally conductive material 48 that facilitates thermal energy transfer to, thermal energy transfer from, or thermal energy transfer to and from the cantilever 44. Notably, the components of probe device 39 may be manufactured independently and coupled or as a unitary component, for example, using photolithography or micromachining. Moreover, probe device 39 may include a single probe, or an array of probes 302 as shown in FIGS. 20 and 21.

During operation, the electric current through drive element 74, 76, 90, 92, and 106 induces heat. The heat will in turn cause a thermal stress gradient due to the different thermal expansivity of the drive layer 43 and the cantilever 88, as in a bimetallic thermal meter. The thermally induced stress gradient excites the cantilever 44, causing its lever 88 to deflect, such as in the manner depicted in FIG. 2. The magnitude, δ, of cantilever deflection preferably is controlled by regulating or controlling the application of thermal energy, preferably providing control or regulation over the magnitude and rate of thermal energy applied. If desired, the magnitude, δ, of cantilever deflection preferably can also be controlled by dissipating thermal energy via the thermal actuator 43, such as when it is desired to reduce or zero the magnitude, δ, of deflection.

In one method of operation, an amount of thermal energy can be applied via the thermal actuator 43 that does not necessarily cause any cantilever deflection, but which does affect the effective spring constant of the cantilever 44. In such a manner, controlled application of thermal energy via the thermal actuator 43 can be used to tune the cantilever 44 by changing its spring constant in a manner that preferably is controllable during operation, even in a real time manner.

Figure 2:
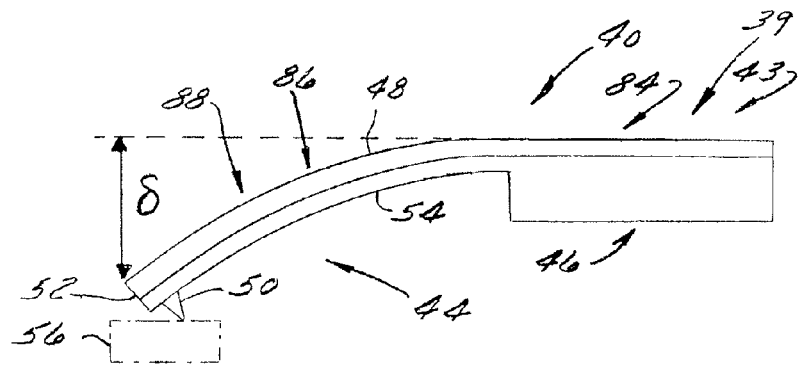
FIG. 2 depicts a side view of the cantilever and drive of FIG. 1 showing the drive deflecting a cantilever lever toward a sample.

As is shown in FIG. 2, application of thermal energy via the thermal actuator 43 causes the lever 88 of the cantilever 44 to deflect. In the preferred embodiment depicted in FIGS. 1 and 2, at least a part of the thermal actuator 43 is disposed on a side 80 of the probe device 39 opposite that of its tip 50 located at or adjacent a free end 52 of cantilever 44. Preferably, the probe 40, including cantilever 44, is made of a material having a thermal coefficient different than that of the thermally more conductive material 48 of the thermal actuator 43 such that applied thermal energy causes the thermal actuator 43 to expand contract at a greater rate than the cantilever 44. Conversely, when thermal energy is being dissipated, such as when cooling is occurring, the thermal actuator 43 will contract at a rate greater than that of the cantilever 44.

The probe device 39, including the cantilever 44 defining lever 88 and coupled to substrate 46 can be fabricated so as to form a probe device 39 of one-piece, unitary and homogenous construction. For example, in the preferred embodiment depicted in FIGS. 1 and 2, the probe device 39 can be fabricated as a single unit of one-piece, unitary and homogenous construction that is made out of silicon.

The thermal actuator 43 is composed of a thermally conductive material 48 that preferably also is electrically conductive such that the thermal actuator 43 functions as a direct contact heating element when electric current is applied. The thermal actuator 43 can be of metallic construction, which can include copper, aluminum, and/or another suitable metal. In a presently preferred embodiment, the thermal actuator 43 is made out of a thermally and electrically conductive material 48 composed of aluminum. If desired, the thermal actuator 43 can be made of aluminum or a aluminum alloy. Other suitable materials that are both thermally and electrically conductive can also be used.

The thermal mechanical drive 42 preferably also includes a thermal mechanical drive controller 58 used to supply energy to the thermal actuator 43 during operation in a way that causes a desired amount of thermal energy to be applied to the probe 40 to drive the cantilever 44 to deflect and/or oscillate its lever 88. Referring to the part of FIG. 1 illustrated in block-diagram format, the thermal mechanical drive controller 58 is linked to a power supply (not shown in FIG. 1) that supplies electric current to its thermal mechanical drive circuitry 62, which is configured to controllably deliver electric current to the thermal actuator 43. Although not shown in FIG. 1, the power supply preferably is of conventional construction and is constructed and arranged to receive electrical power from a utility power grid in a conventional manner.

Although not shown in FIG. 1, components and circuit elements of the drive circuitry 62 are selected to controllably output electric current in a manner that not only permits control of the magnitude, δ, of deflection of the lever 88, but which preferably also can cause the cantilever 44 to be thermally excited into oscillation. Such components and circuit elements can be selected to produce drive circuitry 62 of analog, digital or hybrid construction. For example, drive circuitry 62 of a thermal mechanical drive 42 constructed in accordance with the invention can employ various types and kinds of components and circuit elements, including one or more capacitors, resistors, amplifiers, operational amplifiers, integrated circuits, microprocessors, microcontrollers, field programmable gate arrays (FPGAs), multiplexers, demultiplexers, signal conditioners, filters, switches, and/or the like.

In the preferred embodiment depicted in FIG. 1, the drive circuitry 62 of the thermal mechanical drive controller 58 is configured to implement a plurality of thermal mechanical drive functions, in this case, $I_o$, and, $I_{amp} \sin(\omega t)$, each of which is represented in FIG. 1 by its own function block 64 and 66. Their respective outputs 68 and 70 converge to a summing junction 72, which, in turn, is linked to the thermal actuator 43. During operation, current from either or both outputs 68 and 70 passes through the summing junction 72, after which it is delivered to the thermal actuator 43.

Circuit branches 74 and 76 link the thermal mechanical drive controller 58 to the thermal actuator 43 in a manner that permits current flow in either direction, such as where direct current (DC) and/or alternating current (AC) is applied to the thermal actuator 43. Thus, the directional arrows of each branch 74 and 76 shown in FIG. 1 are exemplary and not intended to be limiting with regard to the direction, magnitude and/or frequency of current flow.

The $I_o$ function block 64 is constructed and arranged to output DC current that is delivered to the thermal actuator 43. In a preferred method of operation, DC current is output to the thermal actuator 43 when it is desired to cause the lever 88 of the cantilever 44 to deflect, including instances where no cantilever oscillation is desired. DC current preferably is also outputted by the $I_o$ function block 64 when it is desired to heat the cantilever 44 to an elevated steady state temperature that is greater than ambient.

The $I_{amp} \sin(\omega t)$ function block 66 is constructed and arranged to output a variable frequency current, such as AC current and the like, which is delivered to the thermal actuator 43. In a preferred method of operation, variable frequency current is outputted to the thermal actuator 43 when it is desired to oscillate the lever 88 of the cantilever 44. In one preferred method of operation, DC current is first outputted by the $I_o$ function block 64 to cause the cantilever 44 to heat to an elevated steady state temperature and variable frequency current is outputted by the $I_{amp} \sin(\omega t)$ function block 66 at a frequency, f to effect heating and cooling of the cantilever 44 at or about the same frequency as the frequency, f, of the variable frequency current. Preferably, DC current is first output by the $I_o$ function block 64 for a sufficient time to cause the cantilever 44 to heat to an elevated steady state temperature before variable frequency current is outputted by the $I_{amp} \sin(\omega t)$ function block 66. If desired, the DC current need not continue thereafter.

The thermal mechanical drive controller 58 can be of standalone construction and/or can be part of another device or piece of equipment. For example, where a thermal mechanical drive 42 constructed in accordance with the invention is implemented in an AFM, the thermal mechanical drive controller 58 can comprise or otherwise be part of an AFM controller (not shown) of analog, digital or hybrid construction.

In one preferred method of operation, a direct current is applied to the thermal actuator 43 to heat the cantilever 44 to an elevated steady state temperature. A variable frequency current, preferably alternating frequency current, is applied to the actuator 43 to excite the cantilever 44 into oscillation at a frequency that is the same as or proportional to the frequency of the applied current. The variable frequency current alternately causes the cantilever 44 to heat and cool at a frequency that is substantially the same as or substantially proportional to that of the applied current.

This alternating heating and cooling pattern creates correspondingly alternating expansion-contraction related thermal stresses in the thermal actuator 43 and cantilever 44 that causes the lever 88 of the cantilever 44 to be excited into oscillation. Since the thermal actuator 43 and cantilever 44 have different coefficients of thermal expansion, the magnitude of thermal stress induced in each correspondingly differs, causing the lever 88 to deflect when non-alternating current is applied to the thermal actuator 43 and causing the lever 88 to oscillate when an alternating frequency current is applied. In a presently preferred embodiment, the thermal actuator 43 is made of a material 48 having a thermal expansivity or thermal expansion coefficient greater than that of the cantilever 44.

In the preferred thermal mechanical drive actuator embodiment illustrated in FIG. 1, the thermal mechanical drive actuator 43 is composed of a layer 78 of thermally and electrically conductive material 48 that overlies the side 80 of the cantilever 44 opposite the tip 50. As a result, thermal expansion due to heat generated by the thermal actuator 43 causes the lever 88 of the cantilever 44 to deflect that displaces or urges the tip 50 toward the sample 56 (FIG. 2) being analyzed.

The actuator layer 78 preferably is disposed in direct contact with part of the cantilever 44. In one preferred embodiment, the actuator layer 78 is integral with the cantilever 44. Where this is the case, the actuator layer 78 can be applied to the cantilever 44 in a manner that fixes it to the cantilever 44 or makes it part of the cantilever 44, such as by deposition, bonding, welding, soldering, or the like.

As is shown in FIG. 1, the actuator layer 78 is configured to have a pattern that is substantially symmetrical along a longitudinal axis 82 of the cantilever 44. As a result of being substantially symmetrical, the application of heat generated and/or otherwise applied during operation is substantially uniform thereby helping to promote substantially uniform cantilever lever 88 deformation strain, e.g., causing deflection.

Figure 3:
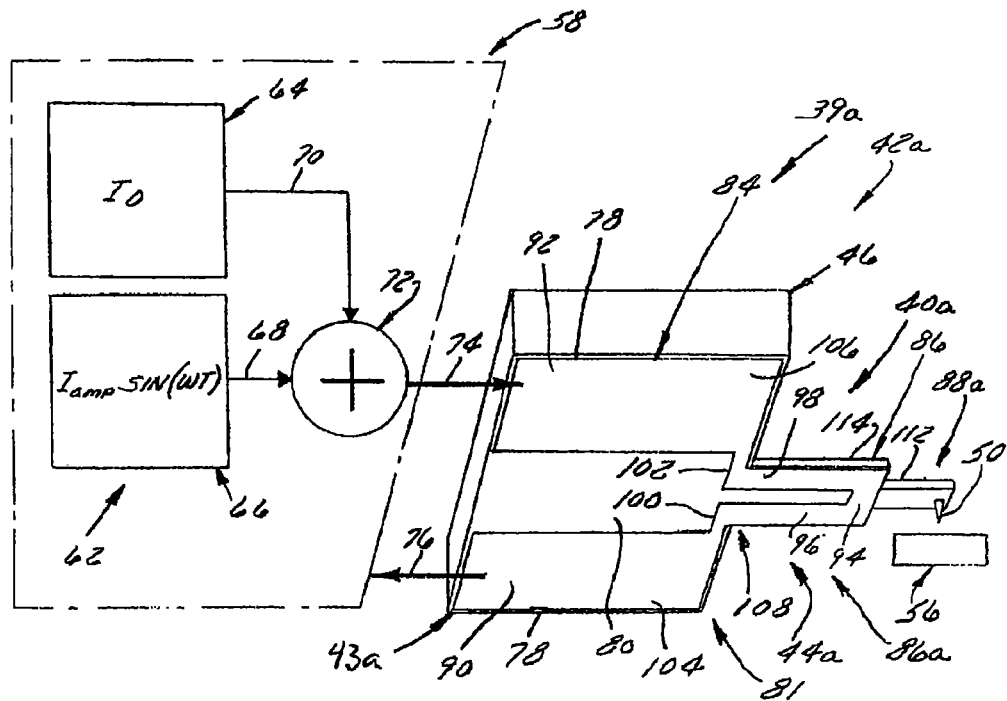
FIG. 3 illustrates a perspective view of a second preferred embodiment of a measurement instrument cantilever and drive therefor along with a schematic block diagram representation of a preferred drive controller connected thereto with the drive disposed along a side common with a sensing element carried by the cantilever.

The actuator layer 78 in FIG. 3 includes a thermal actuator reservoir 84 carried by the cantilever or probe device substrate 46 and a thermal exciter 86 carried by the lever 88 of the cantilever 44. The exciter 86 has a plurality of branches 90 and 92 which are connected, such as by the bridging segment 94 shown in FIG. 1 located at or adjacent the free end 52 of the lever 88. Each branch 90 and 92 communicates with part of the thermal actuator reservoir 84. For example, the thermal actuator reservoir 84 shown in FIG. 1 includes both branches 90 and 92.

As is shown in FIG. 1, a segment of each branch 90 and 92 carried by the lever 88, respectively labeled 96 and 98, is substantially straight and extends in a longitudinal direction along an opposite edge of the lever 88 from the substrate 46 to the free end 52 of the lever 88. Each branch 90 and 92 has a transversely extending outturned segment, respectively labeled 100 and 102, disposed along or near a front edge of the substrate 46. Each branch 90 and 92 includes another segment, respectively labeled 104 and 106, each of which extends in a longitudinal direction along an opposite side edge of the substrate 46.

As is also shown in FIG. 1, the width of the longitudinally extending heating element branch segments 104 and 106 of the portion of the thermal actuator 43 disposed in contact with the probe device substrate 46 is larger than the longitudinally extending heating element branches 96 and 98 of the portion of the thermal actuator 43 disposed in contact with the lever 88 of the cantilever 44. The size, mass and surface area of the thermal actuator reservoir 84 portion of the thermal actuator 43 preferably is greater than that of the thermal exciter 86 for reasons such as explained in more detail below.

The thermal actuator reservoir 84, which includes branch segments 100, 102, 104 and 106 in the embodiment depicted in FIG. 1, is selected to have a suitably large enough contact surface area with the probe device substrate 46 so that heat applied during operation is uniformly and evenly spread heat over the substrate 46 at a heat flux relative to the thermal mass of the substrate 46 that prevents unwanted deflection, twisting, and/or distortion of the substrate 46 from occurring. In fact, the thermal actuator reservoir 84 preferably is selected to have a large enough contact surface area with the probe device substrate 46 such that heat applied during operation may cause the substrate 46 to uniformly expand somewhat but will not cause the substrate 46 to deflect, twist, or otherwise distort. To the extent any deflection, twisting or distortion may occur in the preferred embodiment depicted in FIG. 1, it preferably is insignificant and/or negligible.

During application of heat, the transversely extending thermal actuator branch segments 100 and 102 can be positioned relative to the branch segments 96 and 98 disposed in contact with the cantilever lever 88 to increase the rate of cantilever deflection, preferably during some duration of time when the rate of heat buildup is increasing. For example, branch segments 100 and 102 of the embodiment shown in FIG. 1 are positioned along the front edge of the probe device substrate 46 such that applied heat causes each branch to widen during thermal expansion, which causes compressive thermal stresses to be transmitted to the corresponding thermal actuator branch segments 96 and 98 of disposed in contact with the cantilever lever 88.

Where so configured, a thermal hinge arrangement 108 preferably is formed in the region where thermal actuator branch segments 96 and 100 and 98 and 102 respectively adjoin. As thermal compressive stress increases in the vicinity of the thermal hinge arrangement 108 due to the temperature rising in response to applied heat buildup, a bending moment created along the hinge 108 adjacent where the lever 88 and substrate 46 adjoin can become large enough to impact thermally-induced deflection of the cantilever lever 88. For example, where a thermal actuator 43 is configured with such a thermal hinge arrangement 108, the bending moment created along the hinge 108 during heating preferably becomes large enough at some point during heating that it increases, at least for some duration of time, the rate at which the cantilever lever 88 is deflecting. This preferably also increases the maximum magnitude, e.g., $\delta_{max}$, that the lever 88 is capable of deflecting while also advantageously increasing response by reducing the time needed to deflect the lever 88 a desired amount or magnitude.

The larger surface area and mass of the thermal actuator reservoir 84 enables it to help facilitate cooling of the lever 88 of the cantilever 44 when cooling is desired. During cooling, such as when the amount of heat being applied is reduced or ceased altogether, the thermal actuator reservoir 84 functions as a heat sink that dissipates heat, including heat from the lever 88 conducted to it via the thermal actuator exciter 86. During cooling, the relatively large surface area of the exposed outer surface 110 of the thermal actuator reservoir 84 helps dissipate heat via radiation and convection. The large contact surface area it has with the probe device substrate 46 can help further dissipate heat by being able to conduct some heat to the substrate 46. Depending on the state of thermal equilibrium between these two components, the substrate 46 can increase effective heat sink capacity during cooling by dissipating heat conducted to it from the thermal actuator reservoir 84 via radiation, convection and/or conduction.

As a result, the rate of cooling of the lever 88 of the cantilever 44 is advantageously increased and preferably maximized. This favorably improves cantilever deflection response by decreasing the time it takes to reduce cantilever deflection, including reducing the time required to return the lever 88 to a null or zero deflection position.

Thus, a thermally drivable probe 40 constructed in accordance with the invention is capable of being thermally driven in a manner that results in fast, accurate and repeatable control of cantilever tip position by being able to quickly and precisely control lever deflection. This arrangement also reduces positioning latency, which helps reduce and preferably helps eliminate tip positioning error by helping to ensure that the actual and desired tip position are substantially the same.

In addition, where a thermal mechanical drive 42 constructed and configured in accordance with the invention is employed to excite a cantilever, such as cantilever 44, into an oscillatory mode, the high rate of responsiveness of a thermally drivable probe 40 constructed in accordance with the invention helps ensure that the lever 88 is thermally driven so it oscillates at substantially the same frequency as the frequency of the applied current. This advantageously minimizes any lag time or phase difference between the magnitude and phase of the applied oscillating and/or variable frequency current and the resultant magnitude and direction of resultant cantilever deflection. As a result, a thermally drivable probe 40 constructed in accordance with the invention is capable of being excited into in oscillatory mode at cantilever lever oscillation frequencies greater than 5 kilohertz and preferably at least 10 kilohertz.

In a presently preferred embodiment, applied current flowing through the branches 90 and 92 and bridging segment 94 of the region 86 of the actuator 43 disposed on the cantilever lever arm 88 generates heat which, in turn, leads to thermal expansion. Some of the heat generated also is transferred to the cantilever lever arm 88, which causes it to thermally expand as well. Since the branches 90 and 92 and bridging segment 94 have a greater coefficient of thermal expansion than that of the cantilever 44, the actuator 43 expands more than the cantilever 44 which causes at least the lever arm 88 to deflect, such as by bending along its lengthwise direction in the manner depicted in FIG. 2.

When the magnitude of applied electric current is reduced, including when current flow is completely interrupted, the cantilever lever 88 will cool, reducing its magnitude, $\delta$, of deflection. As a result of the thermal mechanical drive actuator 43 including a reservoir 84, the rate that the lever 88 is cooled is greater than that solely due to radiation and convection heat transfer from the lever 88 itself, which speeds return of the lever 88 toward its null or zero deflection position.

FIG. 3 illustrates another particularly preferred embodiment of a thermally drivable probe device 39a including a probe 40a constructed in accordance with the invention. The probe device 39a is similar to that depicted in FIG. 1, except that the thermal mechanical drive actuator 43a is disposed on the same side 81 of the cantilever 44a as the tip 50 and the actuator 43a does not extend completely to the free end of the cantilever 44a. As a result of locating the thermal mechanical drive actuator 43a on the same side 81 as the tip 50, thermal mechanical drive operation causes the lever arm 88a to deflect in a direction generally away from a sample 56 being analyzed in response to the application of heat.

The cantilever 44a depicted in FIG. 3 also includes a lever 88a of necked down construction that projects outwardly from the substrate 46. However, lever 88a differs from lever 88 illustrated in FIG. 1 in that it includes a probing lever segment 112 that carries the tip 50 and a wider thermally drivable and deformable active lever section or segment 114 located between the probing lever segment 112 and the substrate 46.

Figure 4:
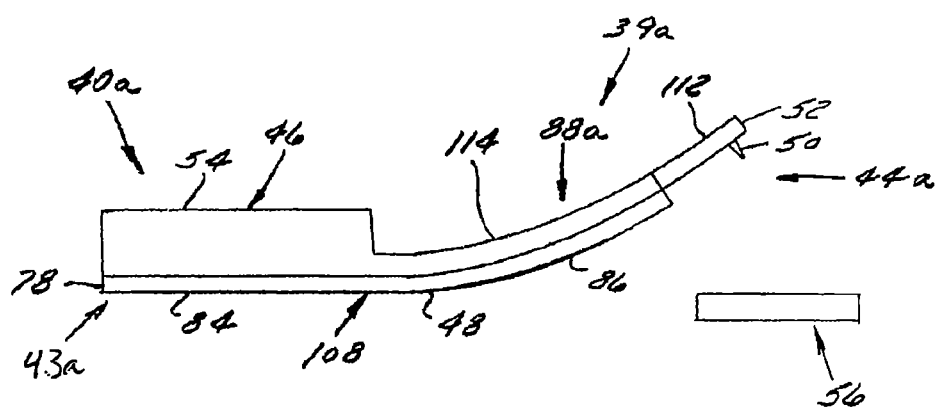
FIG. 4 depicts a side view of the cantilever and drive of FIG. 3 showing the drive deflecting a cantilever lever away from the sample.

Referring additionally to FIG. 4, when the thermally drivable probe device 39a depicted in FIG. 3 is energized by applying current to the actuator 43, thermal actuator expansion causes the active lever segment 114 to deflect, which in turn correspondingly displaces the probing lever segment 112 and the tip 50. Since the thermal mechanical drive exciter 86a is located on the side of the lever arm 88a opposite the tip 50, application of heat via the actuator 43a will drive or deflect the cantilever lever 88a and tip 50 in a direction away from the sample 56 and cooling of the lever 88a will reduce the magnitude of deflection causing the tip 50 to displace toward the sample 56.

Figure 5:
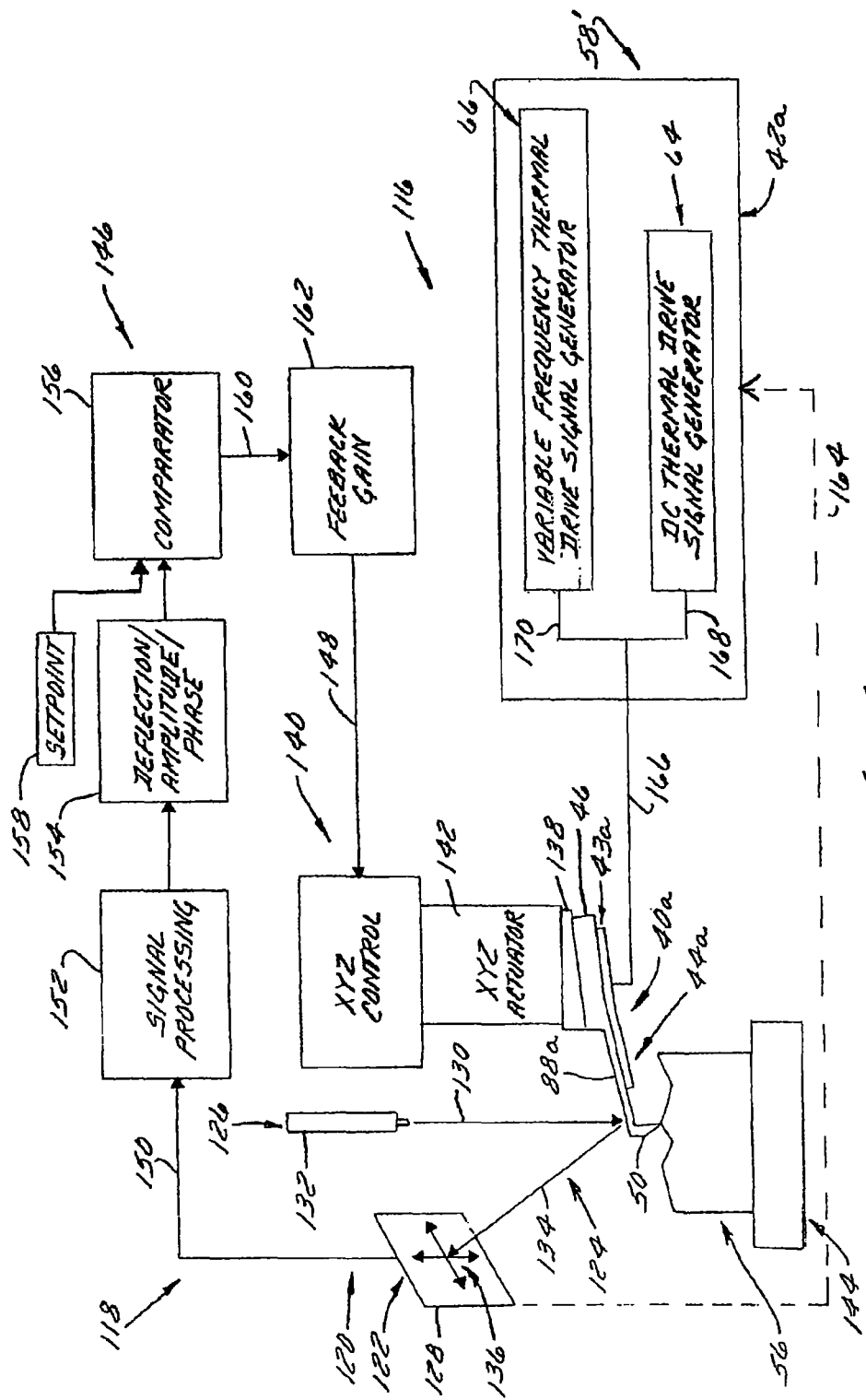
FIG. 5 is a first preferred schematic block diagram depicting a cantilever based measurement instrument including a first drive actuator arrangement capable of relative XYZ cantilever movement and a second drive actuator arrangement, a feedback and control arrangement for the first drive actuator arrangement, and a drive controller for the second actuator arrangement capable of using feedback.

FIG. 5 illustrates a diagram schematically representing a probe-based measurement device 116, namely an atomic force microscope (AFM) 118, which is constructed in accordance with the invention and employs a thermal cantilever drive 42a that includes a thermally drivable probe 40a. In the preferred embodiment illustrated in FIG. 5, the thermal cantilever drive 42a preferably is constructed and arranged in accordance with that depicted in FIGS. 3 and 4. However, if desired, the measurement device 116 can be adapted to accommodate a thermal cantilever drive 42 and/or probe 40 having a construction that corresponds to that shown in FIGS. 1 and 2.

The AFM 118 includes a cantilever detector arrangement 120 used in obtaining positional information related to tip position, preferably by obtaining information pertaining to cantilever deflection. In the preferred embodiment shown in FIG. 5, the detector 120 is an optical deformation strain (e.g., deflection) detection system that includes a detector 122 that senses the location of a reflected component of a focused or coherent energy beam 124 emitted by an emitter 126 to obtain tip positional information.

The detector 122 preferably is a position-sensitive photodetector 128 that includes a plurality of photodiodes (not shown) or the like to enable cantilever position measurement. The beam 124 preferably is a laser beam 130 emitted from an emitter 126 that preferably is a laser 132, a portion 134 of which reflects off the cantilever lever 88a to the photodetector 128. Positional information, preferably including angular deflection, is obtained by measuring the difference between photodiode signals of the photodetector 128 indicative of the location of the laser spot 136 on the photodetector 128.

The photodetector 128 depicted in FIG. 5 preferably is of four segment construction, making it capable of measuring other positional information in addition to angular deflection. Such a four segment photodetector 128 typically outputs a vertical signal from which angular deflection positional information can be obtained and outputs a lateral signal from which torsional deflection positional information and the like can be obtained.

The probe 40a is received in a probe mount 138 that can be of conventional construction or that can be modified to include one or more contacts (not shown) through which current is supplied to the thermal mechanical drive actuator 43 during thermal mechanical drive operation. The probe mount 138 is carried by a drive 140, preferably an AFM scanhead or the like, which preferably is constructed and arranged to be able to effect relative movement between the probe 40a and sample 56 in at least one dimension and preferably in at least a plurality of dimensions. For example, the drive 140 depicted in FIG. 5 is constructed and arranged to be able to effect relative movement between the probe 40a and the sample 56 in three dimensions.

The drive 140 shown in FIG. 5 preferably includes an XYZ actuator arrangement 142 of piezoelectric construction, such as a piezoelectric scanner or tube arrangement of a type known in the art. Although not shown in FIG. 5, such a drive 140 can be implemented using an XY actuator and a separate Z actuator.

However, if desired, the drive can include one or more actuators disposed in operable communication with a cell or sample holder 144 to controllably move the sample 56 relative to the probe 40a. For example, if desired, the sample 56 and/or sample holder 144 can be mounted to or carried by a precision stage or the like which employs one or more piezoelectric stacks (not shown) to move the sample 56 in the X-direction and/or Y-direction. Where this is the case, the probe is driven relative to the sample 56 in the Z-direction by another piezoelectric stack or tube (not shown). Of course, some combination of both could alternately be implemented to effectuate X-Y-Z relative movement.

A controller 146, preferably an AFM controller of analog, digital, or hybrid construction, provides a drive signal 148 to the drive 140 that is based on positional feedback information 150 from the detector 122. In the preferred embodiment shown in FIG. 5, the controller 146 is configured to include a signal processing block 152 to condition the positional feedback information 150 from the detector 122 before discriminating or determining deflection, amplitude and/or phase information 154 from the positional feedback information 150. That result, in turn, is provided to a comparator 156, which compares it to a setpoint 158 in determining an output signal 160 to a feedback gain stage 162 that applies a gain to the error signal. Feedback gain is applied in order to output a corresponding drive signal 148, only one of which is depicted in FIG. 5, having a magnitude great enough to each desired actuator of the drive 140 to cause relative movement to occur between the probe 40a and sample 56 along the desired axis or axes.

A thermal mechanical drive controller 58' can be configured to receive an input signal 164 (shown in phantom in FIG. 5) used in generating a thermal mechanical drive signal 166 that is applied to the thermal mechanical drive actuator 43a to thermally drive the probe 40a. In the preferred embodiment depicted in FIG. 5, input 164 preferably is based on feedback. For example, in the preferred embodiment depicted in FIG. 5, positional feedback information from the detector 122, which can be the same as or some component of the positional feedback information 150 used by controller 146 can be inputted to the thermal mechanical drive controller 58'.

If desired, the input 164 can be processed (e.g., an RMS-to-DC converter) similar to that by or for controller 146 before being compared against a setpoint or the like with the result thereafter being used to help generate the thermal mechanical drive signal 166 or some component thereof. For example, the input 164, after any such processing and the like occurs, can be used to help determine whether to increase or decrease the magnitude of the DC thermal mechanical drive signal component 168 outputted by the DC thermal mechanical drive signal generator 64. Likewise, the input 164 can also be used to help determine whether to increase or decrease the magnitude, frequency and/or some other characteristic of the variable frequency thermal mechanical drive signal component 170 outputted by a variable frequency drive signal generator 66 of controller 58'.

Where the input 164 is provided by the photodetector, it can include both lateral and vertical positional information; but preferably only includes vertical positional information, as is discussed in more detail below in the discussion pertaining to FIG. 6.

During thermal mechanical drive operation, the thermal mechanical drive controller 58' provides a thermal mechanical drive signal 166 to the thermal mechanical drive actuator 43a of the thermally drivable probe 40a to actuate the cantilever lever 88a into deflection and even into oscillation, if oscillation is desired. As is clear from FIG. 5, the probe 40a can be thermally driven whether or not one or more of the actuators 142 of drive 140 are also being actuated. Conversely, it is also clear that one or more actuators 142 of drive 140 can be actuated to effect relative movement between the probe 40a and sample 56 without using the thermal mechanical drive 42a. As a result, an AFM 116 constructed in accordance with that which is schematically depicted in FIG. 5 provides improved versatility and flexibility by being able to drive the probe 40a as well as helping control relative movement between it and the sample 56 using just the thermal mechanical drive 42a, using just drive 140, as well as being able to do so using both the thermal mechanical drive 42a and drive 140.

In one method of AFM operation, the drive 140 and controller 146 are used to drive the probe 40a, including to scan or raster the probe 40a over the sample 56. In another method of operation, the thermal mechanical drive 42a is also used to drive the probe 40a, either by itself or in conjunction with drive 140.

For example, where the probe 40a is configured with a thermal mechanical drive actuator 43 having the pattern shown in FIG. 3, the thermal mechanical drive 42a preferably is used to drive the probe 40a to actuate its cantilever lever 88a only along the Z-axis. In this case, while drive 140 can be configured also to help control relative movement between the probe 40a and sample 56 along the Z-axis, drive 140 preferably is used at least to control relative movement along the X-Y axes to scan or raster the probe 40a over or along the sample 56.

In another method of operation, the magnitude of the thermal mechanical drive signal 166 is controlled, but limited so it does not excite the cantilever 44a into deflecting or oscillating. Where this mode of operation is desired, the thermal mechanical drive controller 58' outputs just enough current to the thermal mechanical drive actuator 43a to heat it up to the extent that a differential in thermal stresses induced in it and the cantilever 44a causes the effective spring constant of the probe 40a to change without causing deflection or oscillation. Such a non-deflecting, non-oscillating mode of thermal mechanical drive operation enables controllable adjustment of the cantilever spring constant, preferably enabling it to be rapidly tuned or changed in real time during MM operation, such as to control the Q of the cantilever 44a during AFM operation.

Figure 6:
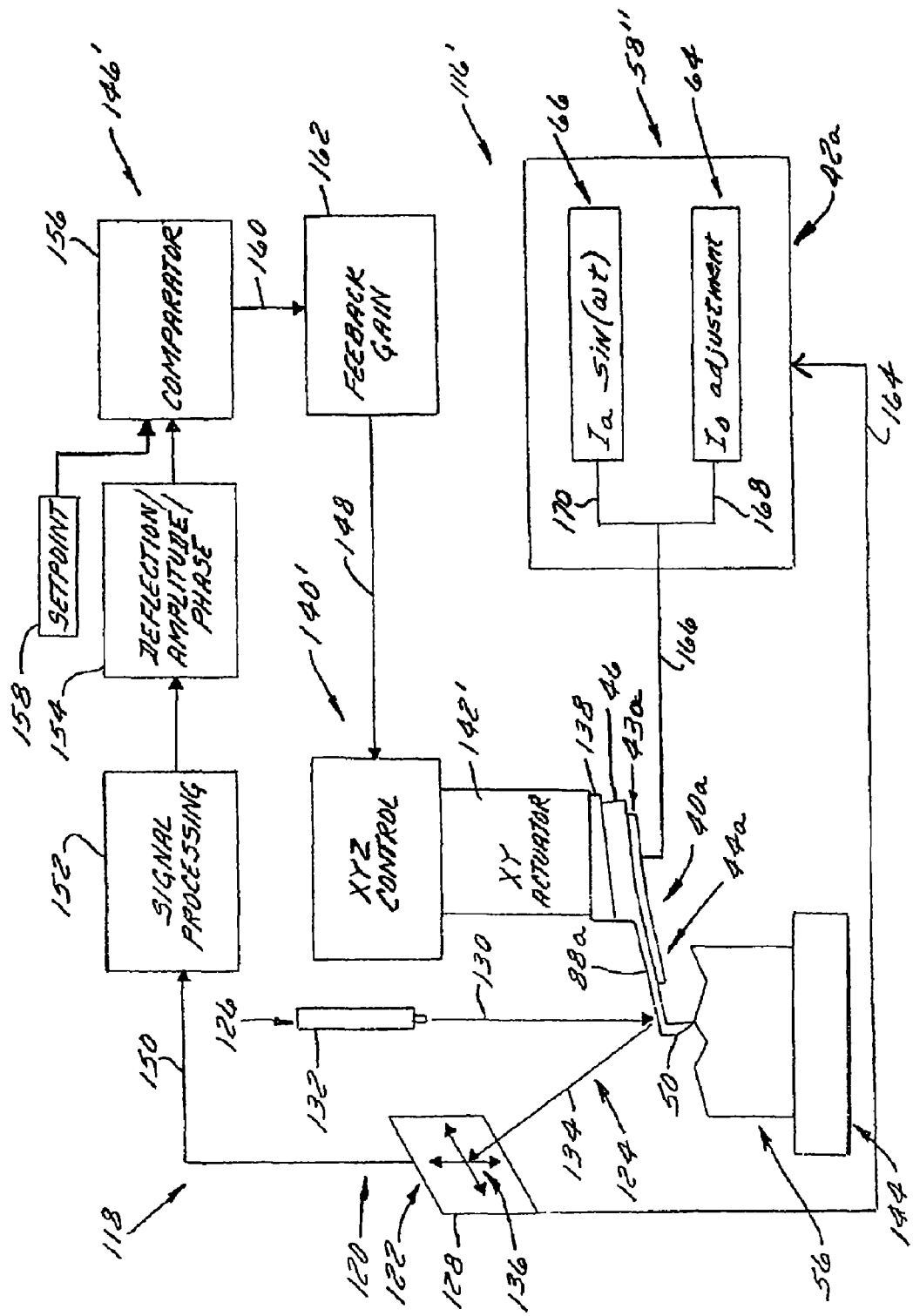
FIG. 6 is a second preferred schematic block diagram depicting a cantilever based measurement instrument including a first drive actuator arrangement capable of relative XY cantilever movement and a second drive actuator arrangement capable of relative Z cantilever movement, a feedback and control arrangement for the first drive actuator arrangement, and a drive controller for the second actuator arrangement capable of using feedback.

FIG. 6 illustrates a schematic diagram of a preferred implementation of an AFM 116' which employs a drive 140' capable of providing relative motion control in at least two dimensions using positional feedback information 150 from the detector 122 that preferably includes both lateral and vertical position information, such as in the form of a lateral signal and a vertical signal from a four segment or four quadrant photodetector 128. In the preferred embodiment depicted in FIG. 6, drive 140' and controller 146' provides relative motion control along the X-Y axes with the thermal mechanical drive 42a and thermal mechanical drive controller 58" provides relative motion control along the Z-axis. If desired, drive 140' and controller 146' can be configured to provide relative motion control along the Z-axis that can be primary, supplemental or complementary to that provided by the thermal mechanical drive 42a and thermal mechanical drive controller 58".

The thermal mechanical drive controller 58" is similar to thermal mechanical drive controller 58' depicted in FIG. 5 except that the DC thermal mechanical drive signal generator 64 receives and uses the positional feedback signal 164 from the detector 122. In the preferred embodiment shown in FIG. 6, the DC thermal mechanical drive signal generator 64 outputs a DC thermal mechanical drive signal component 168 in accordance with the implemented function, $I_{o\ adjustment}$ and the variable frequency thermal mechanical drive signal generator 66 outputs a variable frequency thermal mechanical drive signal component 170 in accordance with the implemented function $I_a \sin(\omega t)$. In this preferred embodiment, the positional feedback signal 164 preferably only includes vertical positional information, such as from the vertical signal that is outputted by a photodetector 128 during AFM operation where the photodetector 128 is of four segment or four quadrant construction.

In a preferred method of generating the thermal mechanical drive signal 166 the thermal mechanical drive controller 58" preferably is configured to mix current for heating the thermal mechanical drive actuator 43a in accordance with the following functional relationships:

$$Q = I^2 R = (I_o^2 + 2I_o I_a \sin(\overline{\omega}t) + I_a^2 \sin^2(\overline{\omega}t)) \cdot R$$

As a result of configuring the AFM 116', including its motion control and actuating components, in accordance with that depicted in FIG. 6, the DC thermal mechanical drive signal generator 64 adjusts the thermal mechanical drive signal component 168 according to the drift of the vertical deflection signal 164 provided to the thermal mechanical drive controller 58' during AFM operation. When the thermal mechanical drive 42a is used, deflection of the cantilever lever 88a will correspond to its temperature change caused by heat generated by the thermal mechanical drive actuator 43a to the extent that deflection is not influenced by sample interaction. When the DC thermal mechanical drive signal generator 64 outputs a DC thermal mechanical drive signal 168, e.g., $I_{o\ adjustment}$, of sufficient magnitude, the lever 88a will deflect vertically, i.e., along the Z-axis, as a consequence of rising average cantilever temperature. The cantilever temperature will also determine the cantilever cooling rate as well as the efficiency of the thermal mechanical drive 42a.

To help maximize thermal mechanical drive efficiency, the layout, configuration, exposed surface area, contact surface area, and other characteristics of a thermally drivable probe 40a constructed in accordance with the invention is selected to preferably keep the cooling rate of the probe 40a, e.g., cantilever 44a, substantially constant. Doing so enables a variable frequency thermal mechanical drive signal 170 to be used to predictably and controllably actuate the cantilever 44a into oscillation. For example, when an AC thermal mechanical drive signal 170 is outputted as the thermal mechanical drive signal 166 or a component thereof to the cantilever 44a, having a substantially constant cooling rate means that the thermal stress change or differential between the thermal mechanical drive actuator 43a and the rest of the cantilever 44a is also substantially constant during each AC cycle.

In the preferred embodiment depicted in FIG. 6, the DC thermal mechanical drive signal component 168 is adjusted during AFM operation to keep the cooling rate substantially constant. This preferably is done by adjusting the DC thermal mechanical drive signal component 168 in response to any drift that occurs over time in the vertical deflection signal outputted by the photodetector 128 that is provided as feedback 164 to the DC thermal mechanical drive signal generator 64.

While the thermal mechanical drive controller 58" can include an active feedback loop (not shown), no feedback loop is shown in FIG. 6 because none is required, at least for the present situation described because vertical deflection signal drift typically occurs very slowly over time during AFM operation. For example, the time scale of current drift adjustment is on the order of minutes or hours, which dramatically contrasts with deflection control requirements for AFM imaging purposes where deflection-related adjustments of the AC thermal mechanical drive signal component 170 must be made within a relatively short time frame that can range between one microsecond and one millisecond (typically no slower than a fraction of a millisecond). Providing drift compensation in this manner, preferably using the drift compensation feedback arrangement depicted in FIG. 6, advantageously helps ensure steady cantilever oscillating in response to being driven using an AC thermal mechanical drive signal component 170. This, in turn, advantageously enables precise imaging control during AFM operation, particularly when the AFM is being operated in an oscillatory mode, such as TappingMode™, where the tip 50 is being oscillated at or near a resonant frequency of the cantilever 44a. This is particularly true and advantageous when operating in TappingMode™ where relatively low tip-sample interaction forces are present.

Figure 7:
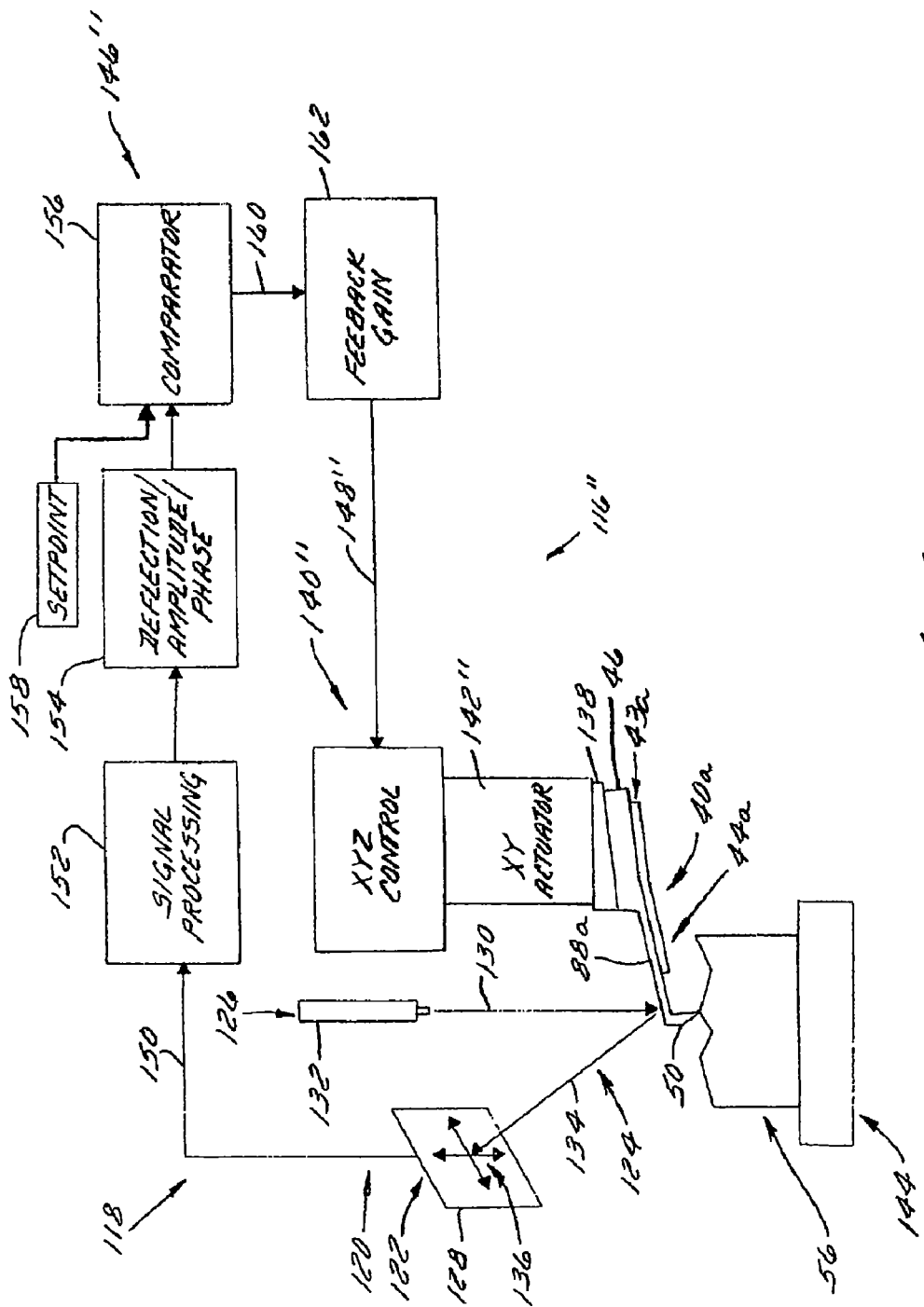
FIG. 7 is a third preferred schematic block diagram depicting a cantilever based measurement instrument including a first drive actuator arrangement capable of relative XY cantilever movement and a second drive actuator arrangement capable of relative Z cantilever movement, and a feedback and control arrangement therefor.

FIG. 7 illustrates a schematic diagram of still another preferred embodiment of an AFM 116" that employs a single drive controller 146" to control the XY actuator 142" of drive 140" as well as the thermal mechanical drive actuator 43a of thermal mechanical drive 42a. In this preferred embodiment, no separate thermal mechanical drive controller, e.g., thermal mechanical drive controller 58 is needed or used. The drive controller 146" outputs a drive signal 148" that includes one or more drive signal components that are ultimately communicated to the thermal mechanical drive 42a as well as a plurality of drive signal components used to drive the XY actuator 142". The drive controller 146" preferably is configured to include one or more of the thermal mechanical drive methods previously discussed that it can utilize for controlling thermal mechanical drive operation.

No matter what type of thermal mechanical drive control methodology is implemented, the drive controller 146" is configured to utilize positional feedback information 150 from the photodetector 122 in determining the desired thermal mechanical drive signal components that get outputted to the thermal mechanical drive 42a. Where the thermal mechanical drive 42a is constructed and arranged such that it only provides the cantilever actuation component, e.g., Z actuator, at least the vertical signal component of the positional feedback information 150 is used in generating one or more of the thermal mechanical drive signal components. In one preferred method, the vertical signal component of the positional feedback information 150 is used to generate the DC thermal mechanical drive signal component in a manner that compensates for vertical signal drift.

Figure 8:
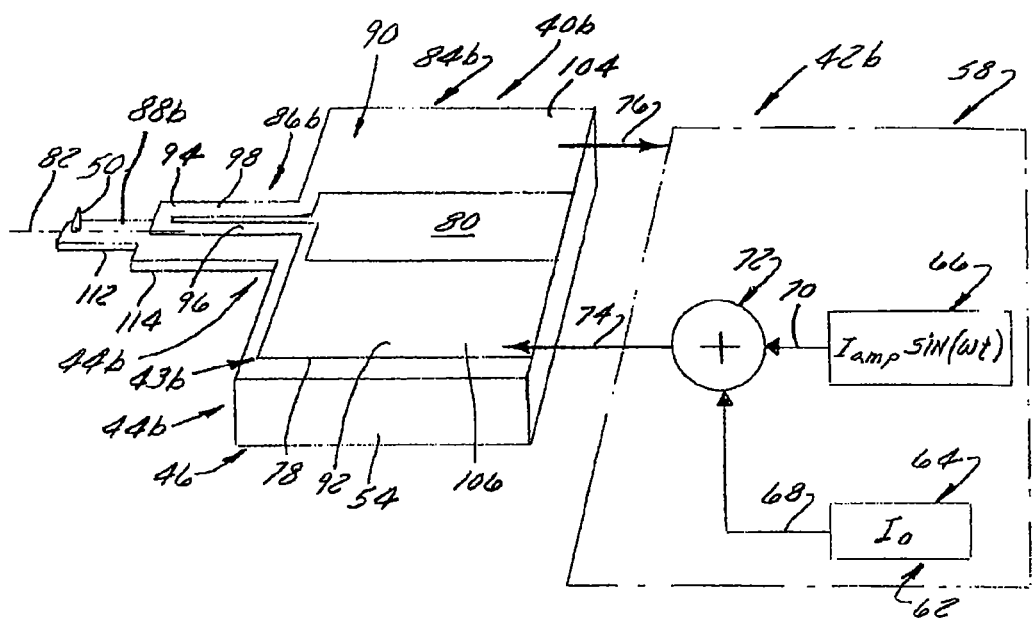
FIG. 8 illustrates a perspective view of a third preferred embodiment of a measurement instrument cantilever and drive therefor along with a schematic block diagram representation of a preferred drive controller connected thereto with the drive including a drive actuator asymmetrically positioned on a lever of the cantilever.

FIG. 8 illustrates another preferred embodiment of a thermally drivable probe 40b and thermal mechanical drive 42b constructed in accordance with the invention. The thermal mechanical drive controller 58 depicted in FIG. 8 can be the same as the controller 58 of FIG. 1 or can be constructed and arranged and configured in accordance with that depicted, for example, in FIG. 5 or 6.

For the purpose of describing the preferred embodiment shown in FIG. 8, cantilever 44b is constructed substantially the same as cantilever 44a shown in FIG. 3, including its lever 88b but can be configured differently, if desired. For example, while the probing lever 112 and active lever 114 is also depicted in FIG. 8 as having the same general configuration as that of cantilever 44a shown in FIG. 3, the lever 88b can have a different configuration, such as like that shown in FIG. 1.

The thermal mechanical drive actuator 43b preferably is similar to that depicted in FIGS. 1 and 3, with the exception that it is configured to define a direct contact cantilever heating element having its thermal actuator exciter 86b offset to one side of the active lever 114 so as to thermally induce a thermal stress differential along the same side of the active lever 114 during thermal mechanical drive operation so as to drive it in an asymmetric flexural mode. This causes the lever arm 88b to torsionally deflect and can also cause the lever arm 88b to angularly deflect.

In the preferred embodiment depicted in FIG. 8, the bridging segment 94 and segments 96 and 98 of the thermal actuator exciter 86b are located along one side of the active lever 114 such that the outside edge of segment 96 lies along the longitudinal cantilever axis 82. For example, the thermal actuator exciter 86b can be oriented such that the outside edge of segment 96 is substantially coincident with axis 82. If desired, it can also be spaced from the axis 82 such that it is located on the same side of the active lever 114 as segment 98.

Figure 9:
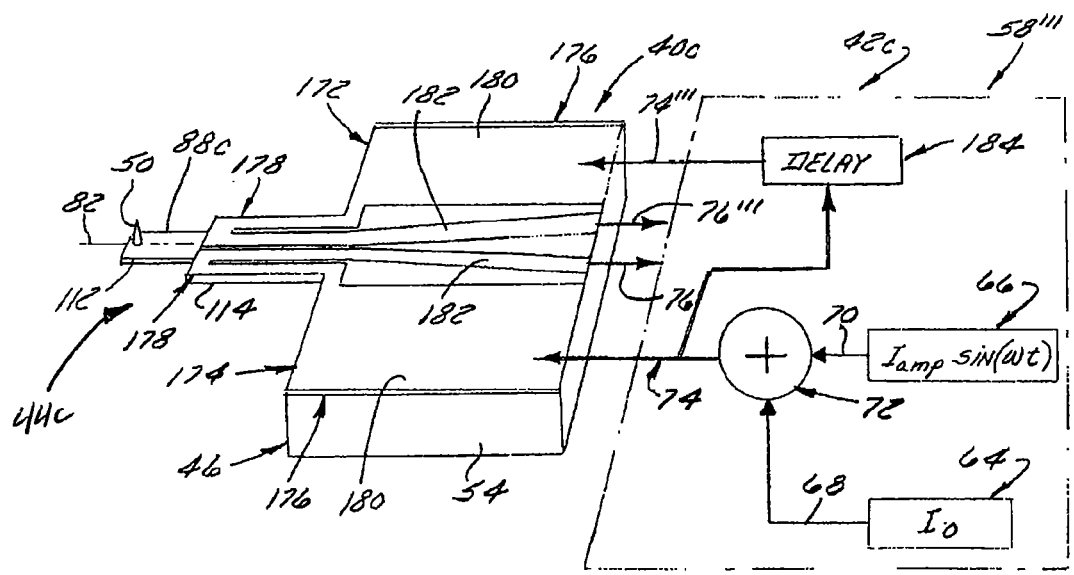
FIG. 9 illustrates a perspective view of a fourth preferred embodiment of a measurement instrument cantilever and plural drive arrangement therefor along with a schematic block diagram representation of a preferred drive controller connected thereto with the plural drive arrangement including a plurality of drive actuators symmetrically disposed relative to a lever of the cantilever and the drive controller including a drive signal delay.

FIG. 9 illustrates still another preferred embodiment of a thermally drivable probe 40c and thermal mechanical drive 42c constructed in accordance with the invention that is capable of providing selective control over angular and torsional deflection, including being able to control torsional deflection about the longitudinal cantilever axis 82 in a clockwise or counterclockwise direction. Once again, the cantilever 44c shown in FIG. 9 can be constructed substantially the same as cantilever 44a shown in FIG. 3, but can be of a different shape or construction if desired.

The probe 40c includes a plurality of thermal mechanical drive actuators 172 and 174 each of which preferably is of similar construction to the thermal mechanical drive actuator 43 depicted FIG. 1. The thermal mechanical drive actuators 172 and 174 are located along opposite sides of the cantilever 44c such that applying current to one of actuators 172 or 174 will cause the corresponding side of the active lever 114 to deflect and applying current to both actuators 172 and 174 will cause both sides of the active lever 114 to deflect.

The thermal actuators 172 and 174 preferably have substantially the same pattern such that one is the mirror image of the other with the longitudinal cantilever axis 82 extending between them, such as in the manner depicted in FIG. 9. As a result, when a thermal mechanical drive signal having the same magnitude, and, where its frequency is varied, the same frequency is applied to both actuators 172 and 174, both will heat and cool at the same rate and have substantially the same heat flux during heating such that deflection, including oscillation, of the cantilever lever 88c will be uniform in the Z-direction.

Each thermal mechanical drive actuator 172 and 174 functions as a direct contact cantilever heating element during heating that includes a thermal reservoir 176 preferably in direct contact with the probe device substrate 46 and an exciter 178 preferably in direct contact with at least some part of the cantilever lever 88c.

In the preferred embodiment shown in FIG. 9, the thermal reservoir of each actuator 172 and 174 includes a wider, more thermally massive segment 180 (i.e., greater thermal diffusivity) located adjacent or along a side edge of the probe device substrate 46 that extends substantially from the end of the fixed end of the cantilever to or adjacent where the lever adjoins the substrate. Also disposed on the substrate 46 is a narrower segment 182 that extends along the central longitudinal cantilever axis 82.

Each thermal mechanical drive actuator 172 and 174 can be independently driven during operation, such as by using separate thermal mechanical drive controllers. Where this is done, one or the other thermal mechanical drive actuator 172 or 174 can be driven, both can be driven at the same time, or, if desired, neither one can be driven at the same time. Where both thermal mechanical drive actuators 172 and 174 are driven at the same time, the drive signal applied to respective thermal mechanical drive actuators 172 and 174 can be the same or be different, including with regard to magnitude or amplitude, frequency and/or phase to effectuate, for example, torsional probe motion.

In the preferred embodiment shown in FIG. 9, a single thermal mechanical drive controller, such as thermal mechanical drive controller 58''', is used. The thermal mechanical drive controller 58''' includes a delay block 184 configured so as to be capable of providing a drive signal outputted via branch 74''' to thermal mechanical drive actuator 172 that differs in some aspect relative to the drive signal outputted via branch 74 to thermal mechanical drive actuator 174. By configuring the thermal mechanical drive controller 58''' to include such a delay 184, the number of thermal mechanical drive circuit components is minimized because, with the exception of those needed to implement the delay 184, only one set is required.

The delay 184 preferably is a delay line or phase shifter configured to change the phase the thermal mechanical drive signal outputted to the thermal mechanical drive actuator 172 so it differs relative to the phase of the thermal mechanical drive signal outputted to the thermal mechanical drive actuator 174. Where the delay time of a delay 184 configured in this manner is adjusted to zero, both drive signals will have the same phase and both thermal mechanical drive actuators 172 and 174 operate synchronously exciting the cantilever 44c in a symmetric flexural mode. Where operated in a symmetric flexural mode, there preferably is no torsional cantilever deflection, only angular deflection relative to the sample 56.

Where the delay 184 is configured or controlled to produce a time delay or phase shift, the cantilever 44c is driven in an asymmetric flexural mode such that the cantilever 44c is excited into torsionally deflecting. Depending on the magnitude or amplitude, frequency and/or phase differential of the two drive signals, the cantilever 44c angularly deflects when torsionally deflecting in asymmetric flexural mode. Preferably, one or more of these variables can be selectively varied to control whether and to what extent angular deflection occurs when operating in an asymmetric flexural mode.

Figure 10:
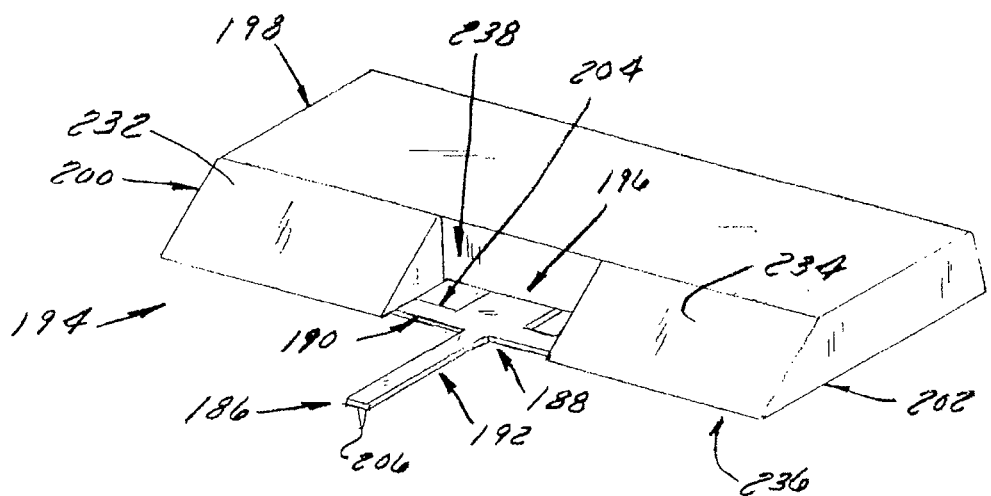
FIG. 10 illustrates a perspective view of a first preferred embodiment of a cantilever and base of the probe device configured with a cantilever drive actuator hinge arrangement.
Figure 11:
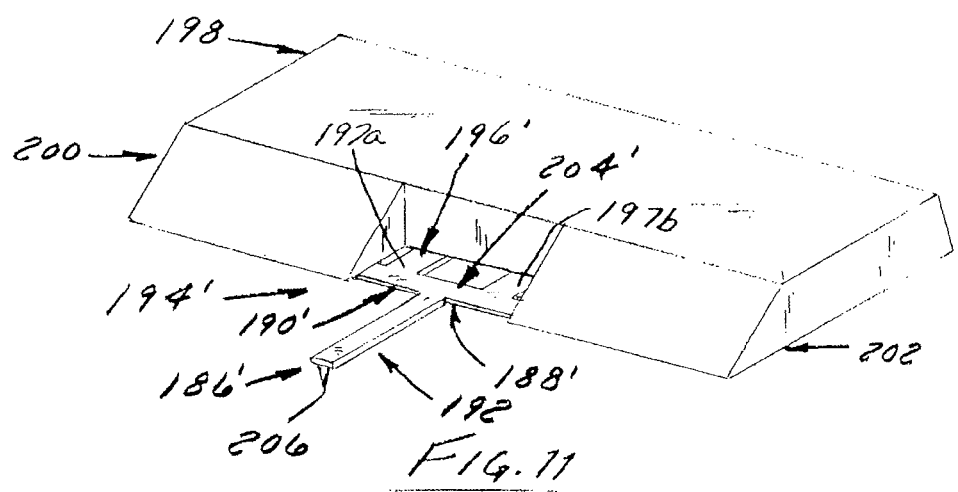
FIG. 11 illustrates a perspective view of a second preferred embodiment of a cantilever and base of the probe device configured with a cantilever drive actuator hinge arrangement.

FIGS. 10 and 11 illustrate another preferred embodiment of a drivable probe, respectively labeled 186 and 186', which includes a hinge arrangement, respectively designated 188 and 188', having a fulcrum, respectively designated 190 and 190', located between a driven lever 192 of the cantilever, respectively designated 194 and 194', and a drive lever arrangement 196 and 196'. Drivable probe 186 and 186' are preferably thermally driven, such as by using one or more thermal mechanical drive actuators.

Each driven lever 192 can be constructed in a manner like that depicted in FIGS. 10 and 11 to include a probe tip 206 or the like. Such a probe tip 206 can be constructed, for example, so as to be the same or similar to tips 50 exemplified in FIGS. 1-9.

The cantilever 194 shown in FIG. 10, is coupled to a much larger base or substrate 198 that carries the driven lever 192, hinge fulcrum 190, and a drive lever 196. Substrate 198 can be of cuboid or parallelepiped construction, such as depicted, for example, in FIG. 1, but preferably includes a pair of spaced apart wedge-shaped sections 200 and 202 disposed toward or along the lever 192.

As is shown in FIG. 10, one wedge-shaped section 200 of substrate 198 is located on one side of hinge arrangement 188 and the other wedge-shaped section 202 is located on the other side of the hinge arrangement 188. The fulcrum 190 of the hinge arrangement 188 preferably extends generally transverse to the driven lever 192 from one wedge-shaped section 200 to the other wedge-shaped section 202. If desired, the fulcrum 190 can be integrally formed of the substrate 198, including one or both wedge-shaped sections 200 and 202, such as where the wedge-shaped sections 200 and 202 form or compose a substrate 198 of one-piece, unitary and homogenous construction.

In the preferred embodiment depicted in FIG. 10, the fulcrum 190 is a bar 204 preferably of generally rectangular and elongate cross-section from which the driven lever 192 outwardly extends from the fulcrum bar 204 in one direction and the drive lever arrangement 196 extends in an opposite direction. In the preferred embodiment depicted in FIG. 10, the driven lever 192 and the drive lever 196 are both oriented generally perpendicular or transverse to the fulcrum bar 204 such that one projects from the fulcrum plate 204 in one direction and the other one projects from the fulcrum plate 204 in a directly opposite direction.

The wedge sections 200 and 202 each define a corresponding fork 232 and 234 of a cantilever hinge yoke 236 that carries the fulcrum cantilever hinge arrangement 188 preferably such that it is disposed between the forks 228 and 239 in a hinge pocket 238 in the substrate 198 and can be cradled thereby. In the preferred embodiment of FIG. 10, one end of the fulcrum bar 204 preferably is fixed to one fork 232 and the other end of the fulcrum bar 204 preferably is fixed to the other fork 234 such that force applied to the drive lever 196 of great enough magnitude creates a rotating moment about the fulcrum bar 204 that can cause the fulcrum bar 204 to torsionally deflect or twist along its longitudinal extent. Where such torsional deflection occurs, it correspondingly causes the driven lever 192 to pivot about the fulcrum bar 204, displacing the driven lever 192 and probe tip 206 substantially in unison therewith.

One advantage of a fulcrum cantilever hinge arrangement 188 constructed in accordance with the invention is that small amounts of fulcrum torsional deflection can produce significant displacement of the probe tip 206, depending on the length of the driven lever 192 and the location of the tip 206 along the lever 192. Such an advantageous arrangement also increases mechanical advantage and produces a fulcrum cantilever hinge arrangement 188 constructed in accordance with the invention having improved response. For example, in a presently preferred embodiment, a fulcrum hinge arrangement 188 constructed in accordance with the invention, including that which is depicted in FIG. 10, is capable of being driven or excited at a response rate of at least fifty (50) kilohertz and preferably one-hundred (100) kilohertz and higher. Where driven or excited into an oscillatory mode, the driven lever 192 can be oscillated at frequencies greater than (50) kilohertz and preferably one-hundred (100) kilohertz and higher whose frequency can be controllably varied in real time during operation. The drive frequency of 196 can vary from DC to higher than 1 Mhz. Notably, frequencies higher than 50 kHz are possible due to the fact that the wider base of 196 operates as a much better heat sink through the fixed substrate 198. High thermal conductive material such as Si is generally preferable to increase the drive response frequency range.

The fulcrum bar 204 and drive lever 196 both have a relatively thin cross sectional thickness, particularly relative to that of the substrate 198. For example, in one preferred embodiment, at least the fulcrum bar 204 has a cross sectional thickness at its widest cross sectional extent that is no more than one-quarter the thickness of the substrate 198. In the preferred embodiment depicted in FIG. 10, the fulcrum bar 204 and drive lever 196 both have a cross sectional thickness of no more than one $100^{th}$ the thickness of the substrate 198. The fulcrum bar 204 and driven lever 196 preferably have the same thickness, which can be the same as the thickness of the drive lever 192.

In a presently preferred embodiment, the fulcrum bar 204 and drive lever 196 both preferably have a thickness on the order of the driven lever 192 and less then one-hundredth the thickness of the substrate 198 so that the effective applied drive or excitation input required to torsionally deflect the fulcrum bar 204 enough to displace the driven lever 192 a particular amount is less than 1% the force required from a conventional piezoelectric actuator to cause the same amount of displacement. In addition, the advantageous construction and arrangement of a fulcrum cantilever hinge arrangement 188 constructed in accordance with the invention improves sensitivity, selectivity, and probe-tip position control because of its excellent responsiveness to drive or excitation inputs of such a small magnitude believed not heretofore possible.

One or more drive actuators (not shown in FIG. 10) cooperate with the drive lever 196 to impact some aspect of the interaction between the probe tip 206 and sample (not shown in FIG. 10). For example, where the drive lever 196 is driven or excited to a great enough extent or magnitude, displacement of the driven lever 192 relative to the sample results. In another preferred mode of operation, it is driven or excited just enough to change the natural frequency and/or Q factor of the cantilever 194.

FIG. 11 has a drive lever hinge arrangement 188' constructed with a drive lever arrangement 196' that includes a pair of spaced apart drive levers 197a and 197b. each drive lever 197a and 197b is transversely offset relative to the driven lever 192 such that one of the drive levers 197a is offset transversely in one direction and the other one of the drive levers 197b is offset in an opposite direction. In the preferred embodiment shown in FIG. 11, the magnitude of offset of both drive levers 197a and 197b is sufficiently great that the inner edge of each drive lever 197a and 197b is offset so as to lie outside the corresponding outer edge of the driven lever 192. Although not shown in FIG. 11, each drive lever 197a and 197b preferably carries a drive actuator such as one of those described previously that results in an exciting force being applied to one or both levers 197a and 197b.

Figure 12:
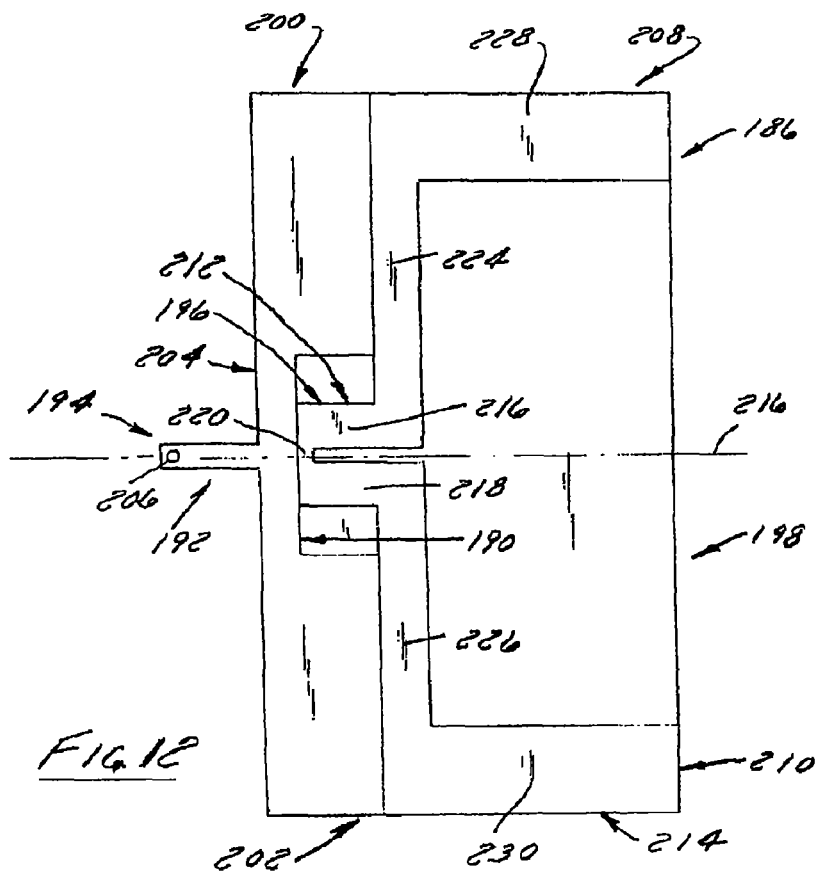
FIG. 12 illustrates a bottom plan view of a first drive actuator arrangement in combination with the first preferred cantilever drive actuator hinge arrangement of FIG. 10.
Figure 13:
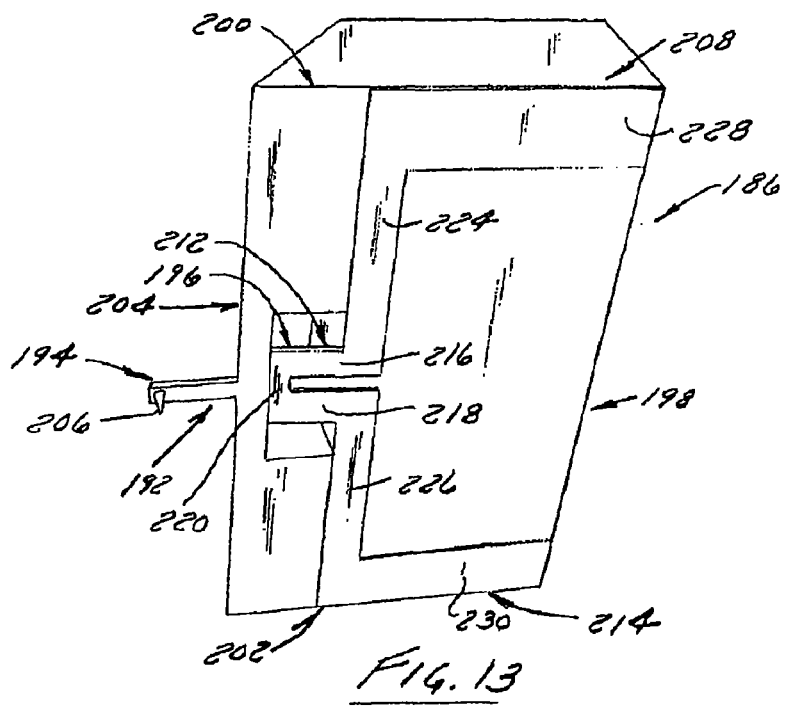
FIG. 13 illustrates a bottom perspective view of the drive actuator arrangement and cantilever drive actuator hinge arrangement shown in FIG. 12.

FIGS. 12 and 13 illustrate a preferred drive arrangement 208 for driving or otherwise exciting the driven lever 192 by applying a force to the driven lever 196. In the preferred drive arrangement 208 depicted in FIGS. 12 and 13, a force is generated along at least part of the drive lever 196 resulting from creation of a stress differential between the drive arrangement 208 and drive lever 196. In the preferred embodiment depicted in FIGS. 13 and 14, the drive arrangement 208 and 210 is an electric current induced thermal mechanical drive where the stress differential results from differences in thermal expansivity between the drive 210 and the drive lever 196 resulting from heat introduced via the drive 210.

During operation, operation of the drive 210 is controlled to precisely regulate heat to control or regulate the cantilever 194 in some manner. Doing so can produce a bending moment about the fulcrum bar 204 of great enough magnitude to impact some aspect or characteristic of the cantilever 194. Depending on the magnitude of the bending moment produced, tip-sample interaction force can be affected in a manner enabling it to be controlled or regulated, the actual force applied by the tip 206 against the sample also can be controlled or regulated, and/or the tip 206 can be controllably displaced relative to the sample.

Where the magnitude of the bending moment is less than that required to affect tip-sample interaction force, change the actual applied tip force, or cause displacement, it can still be controlled or regulated so as to affect at least one other aspect or characteristic of the cantilever 194. Even where no bending moment results, thermal stresses produced during operation of the drive 208 can be controlled to do so.

In either case, operation of the drive 208 is controlled to control or regulate this at least one other desired aspect or characteristic of the cantilever 194. For example, in one preferred mode or method of operation, operation of the drive 208 is controlled in a manner that changes the spring constant or Q of the cantilever 194 without a bending moment about the fulcrum bar 204 being created. In another preferred mode or method of operation, operation of the drive 208 is also controlled in a manner that changes the spring constant and/or Q-factor of the cantilever 194 despite creating a bending moment.

The thermal mechanical drive 210 depicted in FIGS. 12 and 13 can be constructed and configured similarly to one or more depicted, for example, in FIGS. 1 and 2, FIGS. 3 and 4, FIG. 8, or FIG. 9. The thermal mechanical drive 210 has a thermal mechanical drive actuator 212 preferably is disposed in direct contact with the driven lever 192 such that heating of the thermal mechanical drive actuator 212 creates a thermal stress differential between the lever 196 and the drive actuator 212. By varying the width of the drive lever 196 the drive force of the drive lever 196 can be increased even when all other fabrication parameters are kept constant. The actuation coating 212 is generally required to have a substantially different thermal expansivity compared to the material of the drive lever 196. Application of current at contact pads through 208 and 210 will cause the drive lever 196 to buckle and result in twist of the fulcrum. Notably, the bandwidth of such a drive is determined by the effectiveness of the cooling at the contact between lever 196 and substrate 198. High thermal conductivity of drive lever 196 and good thermal sink of substrate 198 will increase the effective bandwidth. The drive power to lever 196 is determined by the relative thickness of the drive coating (current path pattern of actuator 212), referred to as the drive current path, compared to the thickness of the drive lever 196 itself. A preferred combination is to have the same reduced flexural stiffness, defined by the multiplication of the elastic modulus and the thickness:

$$E_{212}*d_{212}=E_{196}*d_{196}$$

Where E stands for elastic modulus and d represent thickness of the corresponding layers. The thermal mechanical drive 210 preferably also includes a thermal reservoir 214 carried by the substrate 198 that functions as a heat sink during cooling and as a heat reservoir during heating.

The thermal mechanical drive actuator 212 preferably is of a U-shaped pattern similar to that depicted in FIGS. 1 and 3 and preferably is substantially symmetric about central longitudinal cantilever axis 216. The thermal mechanical drive actuator 212 is disposed on the same side 216 of the cantilever 194 as the tip 206 but can be arranged such that all of it or a portion of it is disposed on a different side.

Figure 14:
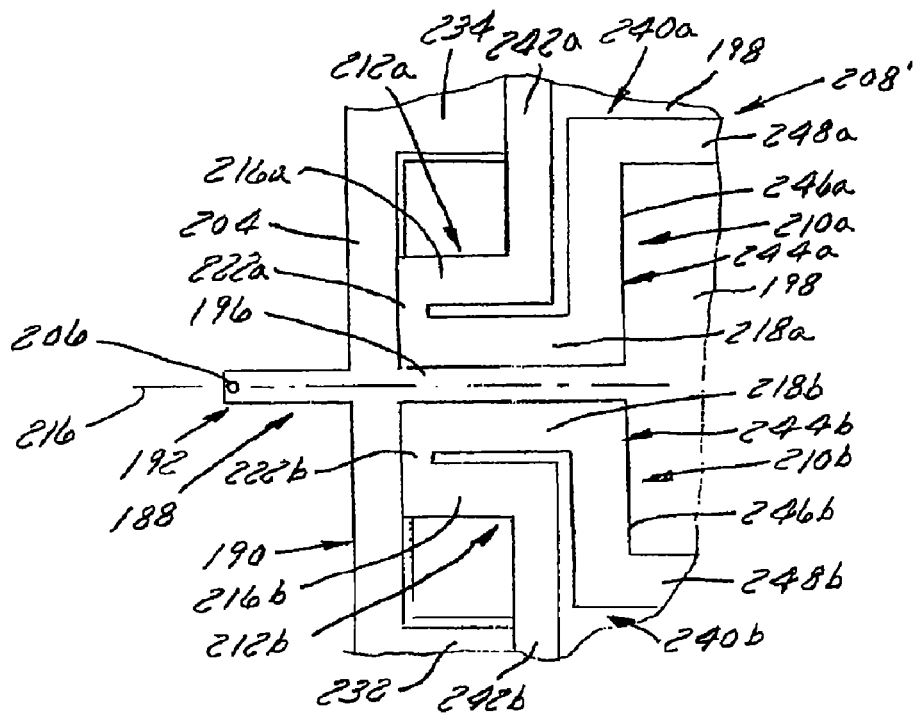
FIG. 14 illustrates a fragmentary bottom plan view of a dual drive actuator arrangement in combination with the first preferred cantilever drive actuator hinge arrangement of FIG. 10.

The thermal mechanical drive actuator 212 is substantially symmetric about the central longitudinal cantilever axis 216. The thermal mechanical drive actuator 212 preferably is composed of a direct contact, resistance heating element that includes a pair of generally longitudinally extending and spaced apart drive actuator segments 218 and 220 connected by a generally transversely extending bridging segment 222 disposed adjacent and preferably along side where the drive lever 196 and hinge fulcrum bar 204 adjoin or interface. As is shown in FIGS. 13 and 14, the actuator segments 218 and 220 are spaced apart creating a gap therebetween exposing a portion of the drive lever 196.

The thermal mechanical drive reservoir 214 preferably also is substantially symmetric about the central longitudinal cantilever axis 216. The reservoir 214 has a pair of oppositely extending transverse segments 224 and 226, each of which extends from a corresponding actuator segment 218 and 220. The reservoir 214 also has a pair of spaced part and longitudinally extending segments 228 and 230, each of which extends from a corresponding reservoir segment 224 and 226. Each longitudinally extending segment 228 and 230 preferably extends along a corresponding side edge of the substrate 198. A portion of each longitudinally extending segment 228 and 230 preferably serves as an electrical contact for coupling with an electrical drive signal source.

The thermal mechanical drive 210 depicted in FIGS. 10, 12 and 13 is driven using a thermal mechanical drive controller configured in accordance with that depicted in, for example, FIGS. 1, 3, 5, 6, 7 or 8. In one preferred embodiment, a thermal mechanical drive controller is employed that is constructed, arranged and operated in accordance with the thermal mechanical drive controller 58 or 58' depicted in one or more of FIGS. 1, 3, 5, 6, 7 and/or 8 and discussed above.

Figure 13A:
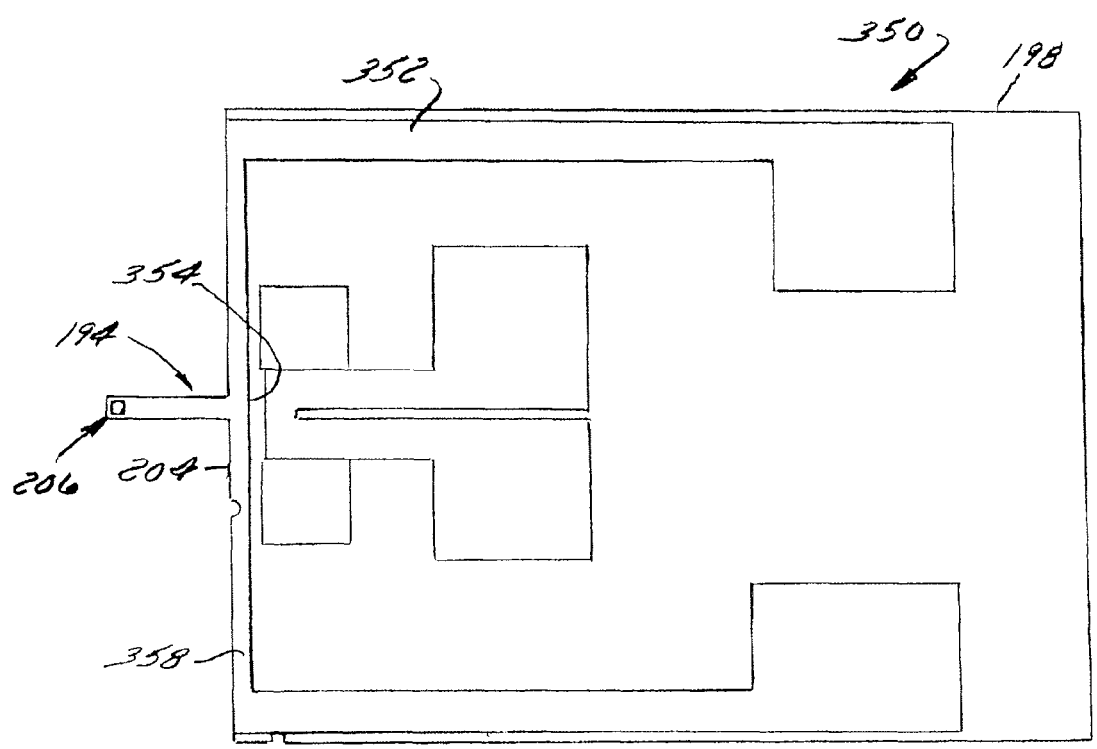
FIG. 13A illustrates an alternative embodiment with the thermal mechanical drive patterned on both fulcrum and the drive lever so that the spring constant, resonance frequency and Q can be adjusted by a second drive pattern.

The spring constant of such a drive assembly is primarily determined by the stiffness of the fulcrum and the driven cantilever 192. In the fulcrum bar 204, if the fulcrum is pre-stressed the spring constant is determined by the rotational elastic stiffness of the bar, and the amount of pre-stress. If the pre-stress is high enough it can dominate the spring constant of the fulcrum bar. The combined contribution of the elastic stiffness and stress induced stiffness leads to another alternative embodiment shown in FIG. 13A. FIG. 13A is a probe device 350 similar to that of FIG. 12 except the current conductive coating 358 on the fulcrum bar 204 that interfaces cantilever 194 supporting tip 206. Again, bar 204 may comprise a thin portion 354 of the deformable base 198, preferably 0.1 to 3 microns thick which is typically less than $\frac{1}{100}^{th}$ of the fixed rigid substrate thickness (typically, about 100-500 microns). The conductive coating 358 should have a substantially different thermal expansivity compared to the material of the fulcrum bar 204 and is preferably 0.1 to 3 microns of a metallic film having a thermal expansivity greater than $1 \times 10^{-5}$. The double arrow bar representing that the fulcrum bar 204 is pre-stressed in tension causing substantial increase of stiffness in the fulcrum bar, analogous to tightened violin strings. When heating current is applied to the conduction path 352, the thermal stress due to expansion of the conductive coating will cancel (partially or totally) the pre-tension in the fulcrum bar 204. Since the current in the current path 352 is continuously adjustable, the spring constant of cantilever probe device 350 in FIG. 13A will also be continuously adjustable.

Consequently the resonance frequency of the device and mechanical Q can also be controlled accordingly.

FIG. 14 illustrates a preferred embodiment of a drive arrangement 208' that is particularly well suited for use with a cantilever 194 equipped with a fulcrum hinge arrangement 188 of the type depicted in FIG. 10 and constructed in accordance with the invention. The drive arrangement 208' is a dual drive arrangement that includes a pair of spaced apart drives, respectively labeled as 210a and 210b, each of which preferably is independently operable and each of which preferably is of thermal mechanical drive construction.

Both drives 210a and 210b have a thermal mechanical drive actuator 212a and 212b carried by a single, common drive lever 196 of hinge arrangement 188. The thermal mechanical drive actuators 212a and 212b are spaced apart from each other such that one actuator 212a is located on one side of central longitudinal axis 216 and the other actuator 212b is located on the other side of the axis 216. Preferably, the thermal mechanical drive actuator 212a on one side of the axis 216 is a mirror image about that axis of the thermal mechanical drive actuator 212b on the other side of the axis.

The corresponding thermal mechanical drive actuator 212a and 212b for each drive 210a and 210b has a pair of spaced apart segments 216a and 218a and 216b and 218b which are interconnected by a corresponding bridging segment 222a and 222b. The corresponding thermal reservoir 240a and 240b for each drive 210a and 210b includes an outer segment 242a and 242b that respectively extends from actuator segment 216a and 216b and an inner segment 244a and 244b that respectively extends from actuator segment 218a and 218b. Each inner segment 244a and 244b can respectively include a transversely extending leg 246a and 246b that each transitions to a corresponding longitudinally extending leg 248a and 248b, which can lead to a contact, terminal or the like (not shown in FIG. 14). Although also not shown in FIG. 14, each outer segment 242a and 242b preferably also communicates with or defines part of a different contact, terminal or the like.

During operation, a single drive controller, such as the drive controller depicted in FIGS. 1, 3, and 8 can be used to drive both drives 210a and 210b. If desired, such a drive controller can be configured with a delay 184 like that depicted in FIG. 9, such as where it is desired to be able to torsionally deflect the driven lever of the cantilever. In another preferred embodiment, each drive 210a and 210b is independently driven by its own drive controller.

Figure 15:
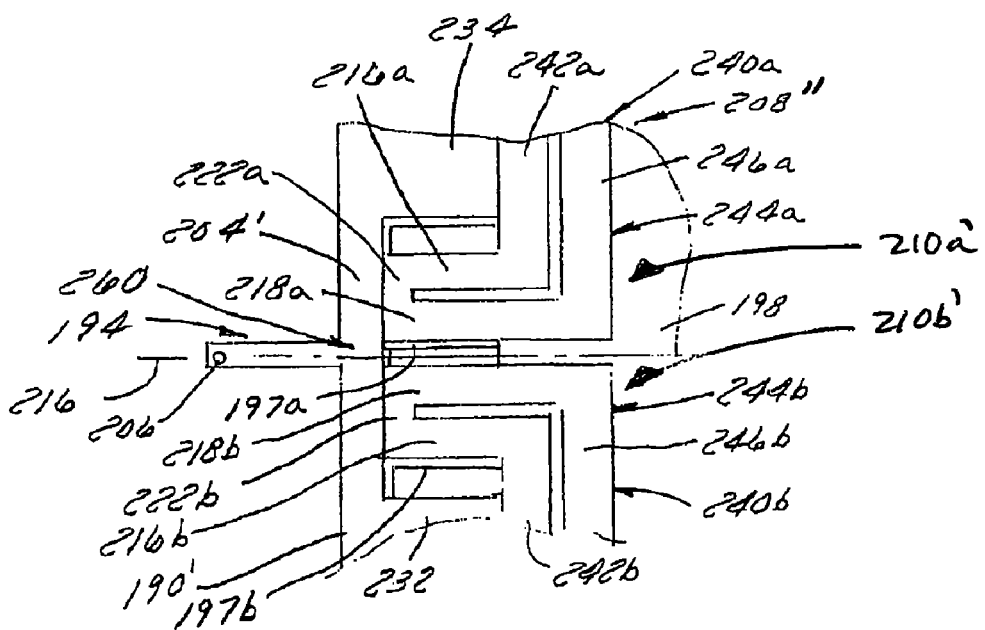
FIG. 15 illustrates a fragmentary bottom plan view of the dual drive actuator arrangement in combination with the second preferred cantilever drive actuator hinge arrangement of FIG. 11.

FIG. 15 illustrates a dual drive arrangement constructed in accordance with the dual drive arrangement 208' depicted in FIG. 14 with a cantilever 194 configured with a dual drive lever hinge arrangement of a same or like construction as the dual drive lever hinge arrangement 188' shown in FIG. 12. In this case, the drive lever 196 is split into two physically separated drive levers, but connected only through the fulcrum bar. During operation, a single drive controller, such as the drive controller depicted in FIGS. 1, 3, and 8 can also be used to drive both drives 210a and 210b. If desired, such a drive controller can be configured with a delay 184 like that depicted in FIG. 9, such as where it is desired to deflect or displace the driven lever 194 of the cantilever in a direction in addition to and/or other than in the Z-direction. In another preferred embodiment, each drive 210a and 210b is independently driven by its own separate drive controller.

In one preferred mode of operation, the drives 210a and 210b are independently driven or driven using a delay that produces a difference in drive signals applied to drives 210a and 210b so as to cause the tip 206 of the drive lever 192 to displace in a direction transverse relative to the central longitudinal axis 216, e.g., in the Y-direction. When operating in such a mode, drive signals preferably can be controllably generated so as to control displacement of the tip 206 in the Y-direction without causing any significant amount of torsional deflection in the driven lever 194. For example and with specific reference to FIG. 15, drive operation is controlled in one such method of operation to produce a difference in the magnitude of the drive force being applied by the drives 210a and 210b in a manner that creates a moment about an axis, such as axis 260 shown in FIG. 15, which causes at least part of the fulcrum 190' to deflect about the axis 260, preferably in the same direction as the created moment. This fulcrum deflection causes the driven lever 192 to correspondingly move, displacing the tip 206 accordingly.

Figure 16:
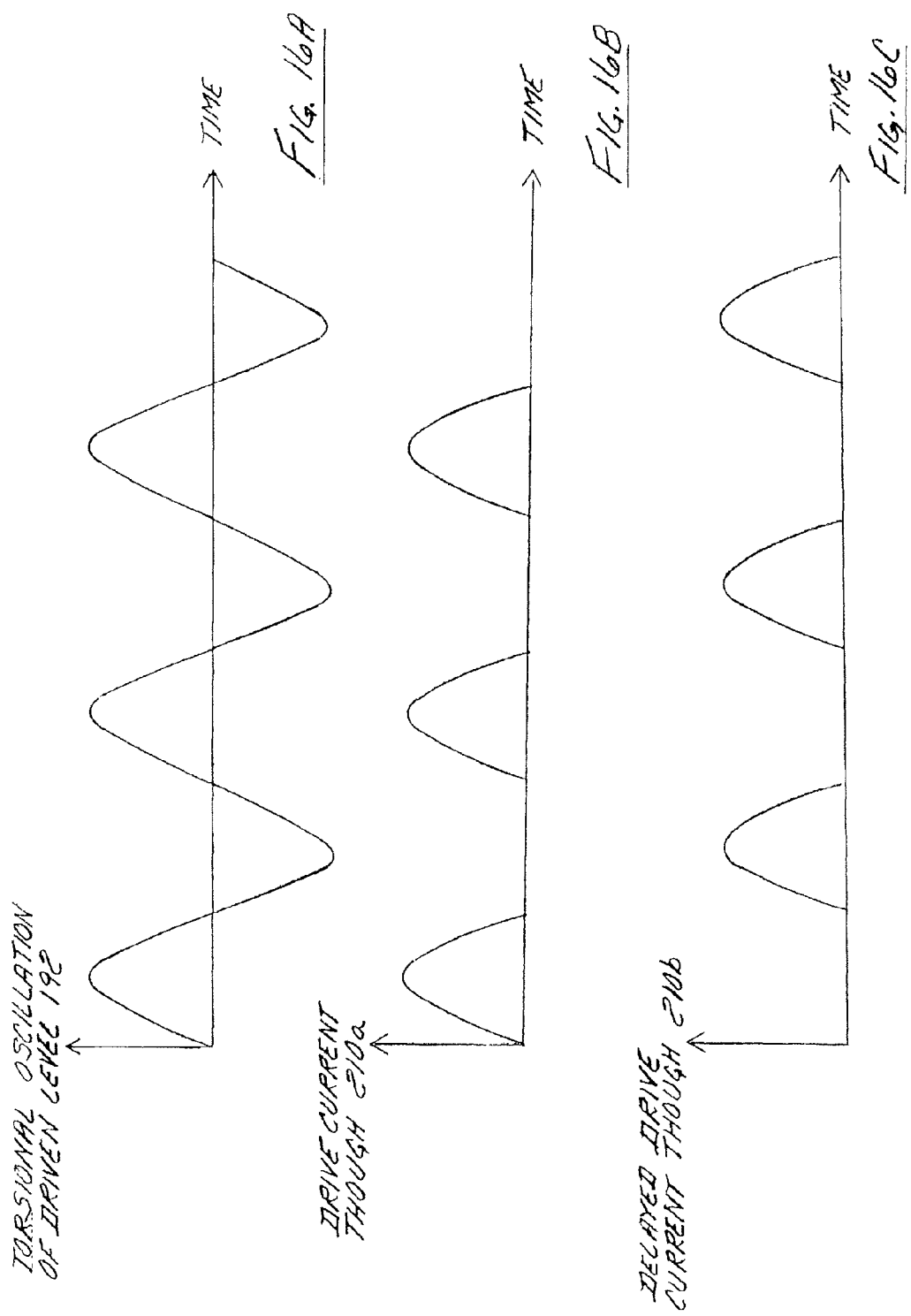
FIGS. 16A-16C is a plot depicting Y-direction cantilever positioning using a dual drive actuator and cantilever drive actuator hinge arrangement in accordance with that depicted in at least one of FIGS. 14 and 15.
Figure 17:
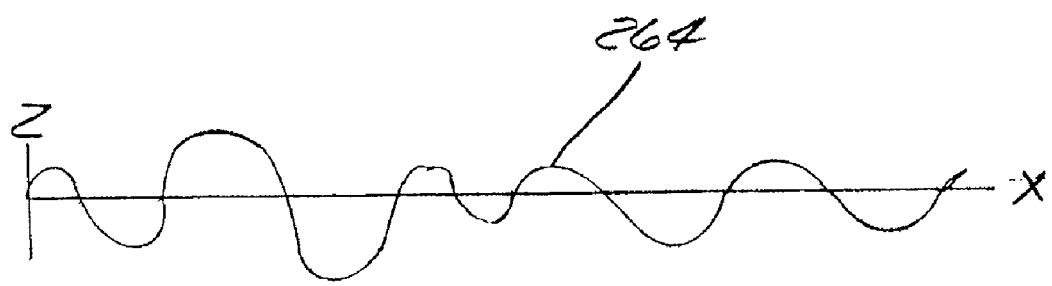
FIG. 17 is a plot depicting Z-direction cantilever positioning using a dual drive actuator and cantilever drive actuator hinge arrangement in accordance with that depicted in at least one of FIGS. 14 and 15.

FIGS. 16 and 17 illustrate an example of a plot depicting how a cantilever equipped with a hinge arrangement 208' or 208", such as illustrated in FIGS. 14 and 15, and dual drives 210a and 210b can be operated in a mode where drive signals applied to each drive enable selective control of the position of the tip 206 in the Y-direction and Z-direction as another actuator induces relative movement between the tip 206 and sample in the X-direction. The curve in FIG. 16A shows the torsional resonance response amplitude of the cantilever as a function of time. The time scale of one period is usually between 1 ms to a few hundred nanoseconds. The plot in FIG. 16B shows the waveform of the drive current at 210a. Since current induced thermal strain deformation can only expand, only half period is needed to drive 2l0a. FIG. 16C shows a delayed drive current signal input to 210b. Preferably, the signal is delayed by exactly 180 degrees, or half of the period, causing asymmetric deformation of 196 in FIG. 14 and 197a and 197b in FIG. 15. Such asymmetric deformation will force the fulcrum asymmetric deformation about the axis 216, therefore torsional motion of cantilever 194.

If the signal in FIG. 16C is not delayed, or being in phase with signal in FIG. 16B, the deformation on 196, or 197a and 197b will be symmetric about axis 216, causing flexural deflection of the cantilever 194 about fulcrum 204.

A theory of operation of a thermal mechanical drive constructed in accordance with the invention is presented herein using, for example, the probe 40 and thermal mechanical drive 42 depicted in FIGS. 1 and 2 for reference. During operation, thermal stress actuation is responsible for excitation of the cantilever 44. When the temperature of the cantilever changes, the difference in thermal expansivity between the cantilever and the drive actuator 43 will result in cantilever deflection in accordance with the following relationship:

$$\delta = \frac{3(1-v_s^2)L_s^2}{d_s^2} \cdot (\alpha_s - \alpha_f) \cdot \frac{E_f}{E_s} \cdot d_f \Delta T$$

where:

$v_s$ is the poisson ratio of the cantilever;

$L_s$ is the length of the cantilever;

$d_s$ is the thickness of the cantilever;

$E_s$ is the modulus of the cantilever;

$\alpha_s$ is the thermal expansivity, i.e., coefficient of thermal expansion, of the cantilever;

$d_f$ is the thickness, e.g. film thickness, of the thermal mechanical drive actuator;

$E_f$ is the modulus of the thermal mechanical drive actuator; and $\alpha_f$ is the thermal expansivity, i.e., coefficient of thermal expansion, of the thermal mechanical drive actuator.

Figure 18:
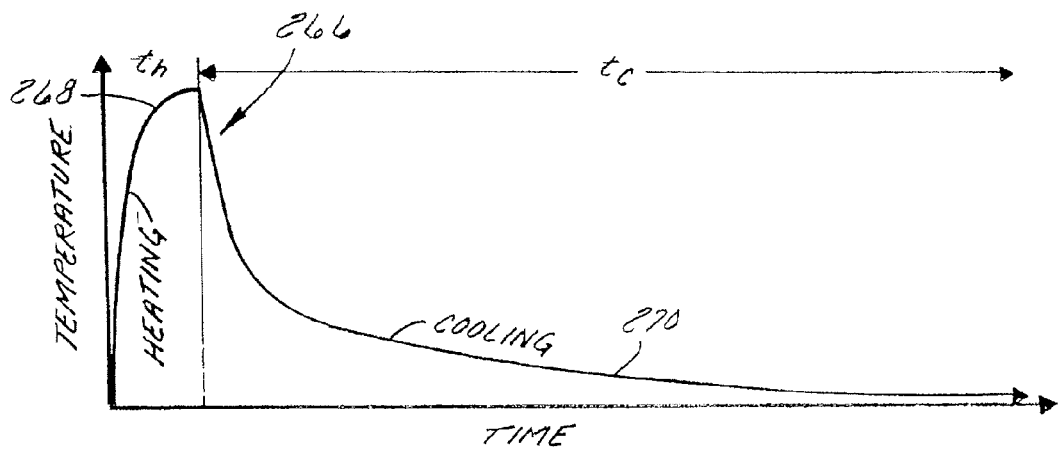
FIG. 18 is a graph depicting heating and cooling curves for a thermal mechanical drive actuator equipped cantilever being operated at an ambient operating point.

As a practical matter, cooling efficiency is a primary factor, if not the primary factor, impacting thermal mechanical drive operation, as illustrated by the curve 266 depicted in FIG. 18. In order for thermal mechanical drive operation to effectively operate, its heating and cooling cycle preferably should be completed so that the cantilever recovers to its neutral position at the end of each cycle. Overall, the heating/cooling cycle time should be less than the probe oscillation frequency during operation, typically defined by the resonance frequency of the probe, or some harmonic thereof.

During heating, the drive controller, such as drive controller 58, controllably generates a drive signal supplied to the thermal mechanical drive to control heating power under a heating curve 268 portion of the curve 266 shown in FIG. 18 in a manner so as to selectively adjust or change its slope. Heating power adjustment preferably is accomplished by controlling or adjusting the intensity or magnitude of the AC current of the drive signal applied by the thermal mechanical drive controller to the thermal drive.

To cause cooling, the drive signal is either ceased or its intensity reduced. As is exemplified by the cooling curve 270 portion of the curve 266 shown in FIG. 18, cooling occurs much more slowly than heating. This is because cooling, as reflected in the amount of cooling time required, is determined by the heat dissipation environment. In the present situation, heat dissipation paths are mainly limited to convection via the outer surfaces of the cantilever and thermal conduction of heat to the base or substrate. Since the volume of the cantilever can be up to a million times smaller than that of the base or substrate and the probe mount (not shown), the base or substrate can be considered an isothermal cooling sink.

Figure 19:
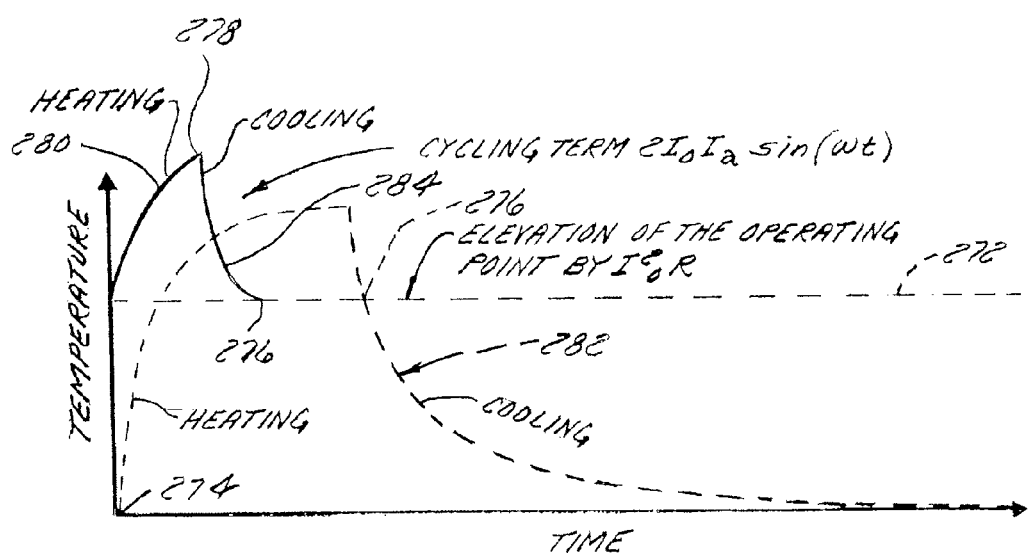
FIG. 19 is a graph depicting a plurality of heating and cooling curves for a thermal mechanical drive actuator equipped cantilever being operated at an operating point elevated above ambient.

Referring more particularly to FIG. 19, to help improve thermal mechanical drive operation and response, including for example making sure the heating/cooling cycle time is less than the desired oscillation cycle time or frequency, the thermal mechanical drive controller preferably is configured using a method of operation to generate an initial pre-heat drive signal, e.g., a DC bias, used to pre-heat the cantilever to elevate its operating point 272 above that of ambient 274. Thereafter, this elevated operating point 272 preferably is maintained by a constant heating through the thermal mechanical drive 42 as needed. In a preferred implementation of this method, the cantilever is preheated to an operating point temperature that ensures that the slope of the cooling curve 284 during cooling preferably will be no less than about the average rate of the heating curve at its operating temperature point of intersection 276 no matter what the heating rate is and no matter what temperature the cantilever is heated above the operating point 272. Doing so ensures cooling rapidly takes place, which advantageously increases cantilever response.

Referring to the thermal mechanical drive controller 58 depicted in FIG. 1, the DC drive signal generator 64 outputs a DC pre-heat drive signal to elevate the operating point of the cantilever by $I_o^2 \cdot R$ to an operating point 272 above the ambient operating point 274. To the extent needed, the DC pre-heat drive signal generator 64 supplies current to the thermal mechanical drive 42 preferably to ensure that the temperature of the cantilever never falls below that of the desired elevated operating point 272. It should be noted that the elevated operating point 272 need not be the same in every situation and for every application. It can change or be varied, depending on factors, such as the rate of cooling desired, the maximum temperature to which the cantilever can be heated, the type of measurement being performed, as well as other factors. For example, where it is sensed that drift occurs during imaging of a sample, the drive signal can be adjusted to raise or lower the elevated operating point 272 as needed to compensate for such drift.

The DC current bias preferably heats at least a portion of the probe in a range of about two to one-hundred degrees Celsius, and preferably near the lower end of this range while still ensuring that the cooling part of the cycle is sufficiently fast to accommodate higher oscillation frequencies. Because the ambient room temperature acts as a heat sink cooling time is greatly improved. Overall, the proper bias to heat the probe above ambient allows for rapid heating and cooling so as to efficiently drive the cantilever.

FIG. 19 illustrates a first curve 278 (in solid) which illustrates a drive signal applied to the thermal mechanical drive 42 that produces a heating curve 280 having a relatively high slope reflecting input of greater amount of heating power than a second curve 282 (in phantom). Where a variable frequency or non-DC drive signal is supplied to the thermal mechanical drive 42, such as by using variably frequency drive signal generator 66 of the thermal mechanical drive controller 58 of FIG. 1, to heat the cantilever above the elevated operating point 272, the drive signal can be tailored or configured to produce a saw tooth-like curve 278 like that depicted in FIG. 19. For example, where such a variable frequency or non-DC drive signal is supplied to the thermal mechanical drive 42, it preferably is done so in conjunction with a DC drive signal and in accordance with the cycling term $2I_oI_a \sin(\omega t)$ depicted in FIG. 19 such that the rise or rate in cantilever heating reflected by the heating curve 280 is relatively rapid.

The first heating and cooling cycle curve 278 illustrates an example of a preferred mode of operation where the variable frequency drive signal outputted to the thermal mechanical drive 42 has a larger maximum magnitude variable frequency current component, $I_a$, and a shorter heating cycle time, t. As previously discussed above, heat, Q, generated by the drive signal applied to the thermal mechanical drive 42 is governed by the following equation:

$$Q = I^2 R = (I_o^2 + 2I_oI_a \sin(\overline{\omega}t) + I_a^2 \sin^2(\overline{\omega}t)) \cdot R$$

where:

$I_o$ is the steady state or DC current drive signal component;

$I_a$ is the variable current, e.g., variable frequency, drive signal component; and T is the cycle time of the variable frequency drive signal component.

The term $I^2 \cdot R$ in the above equation refers to cantilever heating that pre-heats and keeps it heated to a desired elevated operating point 272 such as is depicted in FIG. 19. The term $2I_oI_a \sin(\overline{\omega}t) \cdot R$ in the above equation refers to variable frequency cantilever heating above the desired elevated operating point 272, such as when it is desired to excite the cantilever into oscillation. When $f = \omega/2\pi$ equals the resonance frequency of the cantilever 194, i.e., the natural resonance frequency, the cantilever 194 can be excited to resonate.

As previously mentioned, this advantageously produces a heating and cooling cycle time that is much shorter as compared to operating at or near an ambient temperature operating point, such as is depicted in FIG. 18. As long as this period is shorter than the period of the highest required frequency of actuation, the aforementioned variable frequency heating due to $2I_oI_a \sin(\overline{\omega}t) \cdot R$ is capable to produce a thermal stress with the corresponding frequency. The contribution of the last term, $I_a^2 \sin^2(\overline{\omega}t) \cdot R$, preferably remains negligible as long as $I_o \gg I_a$.

A thermal mechanical drive controller operating in accordance with a method of the present invention can be controllably oscillated in a desired direction relative to a sample being analyzed by controlling these various contributions and components of the drive signal provided to a thermal mechanical drive or thermal mechanical drive arrangement constructed in accordance with the invention. For example, the drive signal can be controlled to control the oscillation frequency, f, by varying ω as needed in accordance with $f = \omega/2\pi$, to achieve oscillation frequencies that range from about DC to 10 Mhz.

FIGS. 14 and 15 respectively illustrate preferred embodiments of a drive arrangement 208' and 208" both of which are particularly well suited for use with a cantilever 194 equipped with a fulcrum hinge arrangement 188 constructed in accordance with the invention. Each drive arrangement 208' and 208" is a dual drive arrangement that includes a pair of spaced apart drives, respectively labeled as 210a and 210b and 210a' and 210b', each of which preferably is independently operable and each of which preferably is of thermal mechanical drive construction. The drive arrangements 208' and 208" depicted in FIGS. 14 and 15 are essentially the same with the exception that the pattern of the dual drive arrangement 208" shown in FIG. 15 is of more compact construction such as for use with a probe device having a substrate that is narrower or more compact.

With specific reference to FIG. 14, the thermal mechanical drive actuator 212a and 212b for each drive 210a and 210b has a pair of spaced apart segments 216a and 218a and 216b and 218b which are interconnected by a bridging segment 222a and 222b.

FIG. 20 illustrates an alternative embodiment 300 in which multiple thermal mechanical drive cantilevers 302, i.e., an array of probes, are fabricated on a common fixed substrate or base 301. The cantilevers (304, 306, 308, 310, 312, 314) all carry a tip (316, 318, 320, 322, 324, 326, respectively) at their end. The spring constant of the levers can be identical or different due to the geometric arrangement by length or thickness associated with each individual lever. For example, cantilever 312 in the figure is longer than all others and cantilever 314 is shorter than all the other levers. The length difference will cause the spring constant to be different. Each cantilever is deposited with a thin film 328 which has a substantially different thermal expansivity than that of the cantilever itself. The drive pads 330 are indexed so that the drive can be applied to each cantilever independently with both DC and AC drive currents. The reference plane ABCD represents the flat position of the cantilever when no thermal drive current is applied.

If the thermal expansivity of the deposited drive layer 328 is higher than that of the cantilever, application of a DC current will cause the cantilever to bend up from the tip side, lifting the cantilever to a higher position. In operation, when only one tip is needed to interact with the sample at a time, the cantilever chosen should assume the lowest position relative to the sample (cantilever 308, for example, in FIG. 21). This can be done by applying a DC current to all other levers other than 308, thus causing these levers to deflect up substantially higher than lever 308. Such an arrangement will allow only probe 308 to interact with the sample. While cantilever 308 can still receive AC or a slightly biased AC drive to produce oscillation for imaging, all other levers are constantly deflected away from the sample so that their tips are preserved when they are not in service.

More particularly, FIG. 21 illustrates the thermal mechanical drive for a cantilever array 302. The high DC bias can cause the cantilevers to deflect hundreds of nanometers to microns higher than the reference plane ABCD. As a result, cantilever probe device 300 approaches the sample surface (not shown), tip 320 of lever 308 remains the closest point to the sample. A low DC bias and AC drive combination will cause lever 308 to oscillate at an amplitude generally smaller than 100 nm. This amplitude can be used to control tip-sample interaction, as occurs in conventional tapping imaging. Again, the other cantilever probe tips are kept far away from the sample surface. When the operator wishes to use a different lever (304-314), in 310 for example, the high DC bias is then applied to levers 304, 306, 308, 312 and 314. Lever 310, in contrast, will receive a low DC bias plus an AC drive for imaging control.

In one embodiment, two or more probes are fabricated so that their cantilevers are sufficiently close (adjacent pairs, 306 and 308 for example, having longitudinal central axes within about twenty microns of one another along their length, and more preferably, within about ten microns of one another) to permit the AFM laser beam of the optical detection apparatus to impinge upon both. In this arrangement, a pair of indexed probes can be employed by the operator as a primary and a back-up probe, in the event of catastrophic failure, for instance. In an alternative, the adjacent pair could be used as a survey probe and an imaging probe. In this case, the survey probe would typically be a relatively heavily used probe having a worn or dull tip (radius more than 20 nm) to quickly survey the sample surface, with the more precise probe having a sharp tip being reserved for imaging a region of interest. In one preferred embodiment, the data collected by the survey probe can be used to identify a region of interest to be scanned by the imaging probe. Notably, such an arrangement cannot be readily implemented using zinc oxide active probes given the difficulties associated with processing such probes, including requiring significantly longer cantilevers to accommodate the piezo actuators which, in turn, limits the ability to produce two such levers spaced by about twenty microns. As shown in FIG. 21, levers of differing lengths can be accommodated in the preferred embodiments.

In one example, the AFM is operated to scan a sample with one of a pair of indexed probes, while the other of the pair is actuated so as to not interfere with the operating probe. The non-used probe is actuated by applying a constant thermal force that, for example, lifts the tip up and out of the way of the operating probe. Removing the thermal force returns the probe to its resting state, ready to be employed by the operator. For instance, the survey probe can be used as the operating probe while the imaging probe is thermally lifted out of the way. Once a region of interest is identified, by the operator or software, the imaging probe can be introduced to the sample, manually by the operator or automatically in response to feedback based on software output. At that point, the survey probe is thermally actuated (e.g., out of the optical path of the deflection detection system) so the imaging probe can be used to scan the sample surface.

Alternative cantilever configurations are also possible. For instance, a cantilever could have two opposed fixed ends and an unsupported central portion. Another cantilever to which the invention is applicable comprises a fixed membrane with a fixed circumference. In these cases, the electromagnetic actuator and the cantilever are configured to interact with one another to impose a force on a central portion of the cantilever.

Although the best mode contemplated by the inventors for carrying out the present invention is disclosed above, practice of the present invention is not limited thereto. It will be manifest that various additions, modifications and rearrangements of the features of the present invention may be made without deviating from the spirit and scope of the underlying inventive concept. The scope of still other changes to the described embodiments that fall within the present invention but that are not specifically discussed above will become apparent from the appended claims.

We claim:

1. A drive actuator for a measurement instrument including a probe device having at least one probe, the drive actuator comprising a heating element disposed in a thermally conductive relationship with the probe, wherein the probe and the heating element have different corresponding thermal expansivities such that application of thermal energy to at least one of the probe and the heating element oscillates the probe at a frequency;
wherein a heating/cooling cycle time associated with oscillating the probe is less than about a cycle time associated with the frequency.

2. The drive actuator of 1, wherein a DC bias current is applied to the probe to heat the probe above ambient temperature.

3. The drive actuator of claim 2, wherein the DC bias current heats the probe less than about 500° Celsius.

4. The drive actuator of claim 3, wherein the DC bias current heats the probe less than about 2° Celsius.

5. The drive actuator of claim 1, wherein the application of thermal energy includes applying electrical current to the heating element to cause thermal stress in the probe during interaction with a sample modifying interaction between the probe and the sample.

6. The drive actuator of claim 1, further comprising:
a deformable base interfacing the probe; and
wherein application of thermal energy causes the deformable base to deform and deflect the probe.

7. The drive actuator of claim 6, wherein the deformable base is part of the probe, and wherein the probe comprises an elongate cantilever interfacing a thermally deformable base at its fixed end and a lever cantilevered outwardly therefrom that carries a sensing element and wherein application of electric current creates a thermal stress differential between the heating element and at least a portion of the cantilever that modifies interaction between the sensing element and the sample.

8. The drive actuator of claim 7, wherein the probe is comprised of a material having a coefficient of thermal expansion that is different from the coefficient of thermal expansion of an electrically and thermally conductive material of which the heating element is comprised.

9. The drive actuator of claim 8, wherein the heating element is comprised of an electrically and thermally conductive material that is in direct contact with at least part of the probe.

10. The drive actuator of claim 7, wherein the thermal stress differential between the heating element and the cantilever changes at least one of 1) a spring constant of the cantilever without causing substantial deflection of the cantilever, 2) a Q-factor of the cantilever, and 3) a resonant frequency of the cantilever.

11. The drive actuator of claim 1, wherein the frequency is one of a torsional resonance frequency of the probe and a flexural resonance frequency of the probe.

12. The drive actuator of claim 1, wherein the heating element comprises a resistance heating element composed of an electrically and thermally conductive material disposed in direct contact with at least a portion of the probe.

13. The drive actuator of claim 12, wherein the probe comprises a cantilever having a fixed end and a lever cantilevered outwardly therefrom that carries a probe tip that projects outwardly from one of a top and bottom surface of the lever and interacts with a sample during measurement, and wherein the heating element is carried by one of the top and bottom surface of the lever.

14. The drive actuator of claim 13, wherein thermally induced stresses caused by heating of the probe rotates the probe tip.

15. The drive actuator of claim 14, wherein the thermally induced stresses oscillate the probe tip at a torsional resonance.

16. The drive actuator of claim 12, wherein the probe comprises a cantilever having a fixed end and a lever cantilevered outwardly therefrom that carries a sensing element that interacts with a sample during measurement and wherein the heating element comprises a portion with a first thermal diffusivity carried by a base and a section carried by at least a portion of the lever having a second thermal diffusivity less than the first thermal diffusivity.

17. The drive actuator of claim 16, wherein the higher thermal diffusivity section of the heating element comprises a heat sink that facilitates cooling when the application of thermal energy is reduced or stopped.

18. The drive actuator of claim 12, wherein the probe comprises a cantilever interfacing a deformable base at a fixed end and a lever cantilevered outwardly therefrom that carries a probe tip that interacts with a sample during measurement, and wherein the heating element comprises a first section carried by the deformable base and a second section carried by the lever wherein the first section has at least one of (1) a greater contact surface area with the base than the contact surface area of the second section with the lever, and (2) a greater thickness of the base.

19. The drive actuator of claim 1, wherein the probe comprises a cantilever interfacing a deformable base at a fixed end and a lever cantilevered outwardly therefrom that carries a tip that interacts with a sample during measurement, and wherein the heating element comprises a first section carried by the base and a second section carried by the lever both of which are substantially symmetrical relative to a central longitudinal axis of the cantilever.

20. The drive actuator in claim 19, wherein the first and second sections of the heating elements are driven synchronously to produce flexural deflection of the cantilever.

21. The drive actuator in claim 19, wherein the first and second sections of the heating elements are driven asynchronously to produce torsional deflection of the cantilever.

22. The drive actuator of claim 1, wherein the probe comprises a cantilever having a fixed end coupled to a base and a lever cantilevered outwardly therefrom that carries a tip that interacts with a sample during measurement, and wherein the heating element comprises a first section carried by the base and a second section carried by the lever wherein at least the second section is asymmetric relative to a central longitudinal axis of the cantilever.

23. The drive actuator of claim 1, wherein the probe comprises a cantilever having a fixed end coupled to a base and a lever cantilevered outwardly therefrom that carries a tip that interacts with a sample during measurement and wherein the heating element comprises a first section carried by the base and a second section carried by the lever wherein the first section comprises a plurality of spaced apart electrical contacts carried by the base for connection to an electrical current source.

24. The drive actuator of claim 23, further comprising a probe mount comprising a plurality of spaced apart electrical contacts each respectively mating with a corresponding one of the plurality of electrical contacts carried by the base of the probe device when the cantilever is received in the probe mount.

25. The drive actuator of claim 1, wherein the application of thermal energy is through at least one of laser heating, inductive heating, microwave heating and irradiation heating.

26. The drive actuator of claim 1, wherein the probe includes an array of probes, wherein at least two adjacent probes of the array are spaced less than about 20 microns substantially along the longitudinal axes of the adjacent probes.

27. The drive actuator of claim 26, wherein the adjacent probes include a survey probe and an imaging probe, and wherein the survey probe has a radius larger than the imaging probe.

28. A method of driving a probe of a measurement instrument, the method comprising:
 providing a probe device having at least one probe;
 thermally oscillating the probe using a heating element disposed in a thermally conductive relationship with the probe, wherein the probe and the heating element have different corresponding thermal expansivities such that by applying thermal energy to at least one of the probe and the heating element the probe oscillates at a frequency; and
 wherein a heating/cooling cycle time associated with oscillating the probe is less than about a cycle time associated with the frequency.

29. The method of claim 28, wherein the frequency is at least one of a torsional resonance frequency of the probe and a flexural resonance frequency of the probe.

30. The method of claim 28, wherein a DC bias current is applied to the probe to substantially continuously heat the probe at least about 2° Celsius over ambient.

* * * * *